United States Patent
Ruiz-Meraz et al.

(10) Patent No.: US 10,999,388 B2
(45) Date of Patent: May 4, 2021

(54) MANAGING SUBSCRIPTIONS FOR EVENT NOTIFICATIONS

(71) Applicant: Microsoft Technology Licensing, LLC, Redmond, WA (US)

(72) Inventors: Cesar M. Ruiz-Meraz, Bothell, WA (US); Clemens F. Vasters, Kirkland, WA (US); David L. Stucki, Bellevue, WA (US); Hillary Caituiro Monge, Redmond, WA (US); Hitesh Madan, Seattle, WA (US); Jayaraman Kalyana Sundaram, Redmond, WA (US); PadmaPriya Aradhyula Bhavani, Bellevue, WA (US); Venkata Raja Gopal Ravipati, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 21 days.

(21) Appl. No.: 15/906,926

(22) Filed: Feb. 27, 2018

(65) Prior Publication Data
US 2019/0058681 A1  Feb. 21, 2019

Related U.S. Application Data

(60) Provisional application No. 62/545,806, filed on Aug. 15, 2017.

(51) Int. Cl.
*H04L 29/08* (2006.01)
*H04L 12/18* (2006.01)
(Continued)

(52) U.S. Cl.
CPC .............. *H04L 67/26* (2013.01); *G06F 9/542* (2013.01); *H04L 12/1859* (2013.01);
(Continued)

(58) Field of Classification Search
CPC ........ H04L 51/24; H04L 47/12; H04L 47/783; H04L 12/1859; H04L 1/887; H04L 45/7453
See application file for complete search history.

(56) References Cited

U.S. PATENT DOCUMENTS 7,685,265 B1 *  3/2010  Nguyen ................ G06F 16/958
                                                        709/223
7,945,813 B1    5/2011  Watson et al.
(Continued)

FOREIGN PATENT DOCUMENTS

| EP | 1486897 A1 | 12/2004 |
| EP | 1758342 A1 | 2/2007 |
| GB | 2348025 A | 9/2000 |

OTHER PUBLICATIONS

"International Search Report & Written Opinion Issued in PCT Application No. PCT/US2018/039625", dated Oct. 9, 2018, 16 pages.
(Continued)

*Primary Examiner* — Dhairya A Patel
(74) *Attorney, Agent, or Firm* — Mannava & Kang, P.C.

(57) ABSTRACT

Systems and methods for dispatching targeted event notifications to subscribers are disclosed. In an example embodiment, a notification indicating creation of an even subscription by a subscriber may be received. An event source may be invoked to enable publishing of events corresponding to an event topic associated with the event subscription. A response from the event source for publishing of the events may be received and targeted event notifications may be forwarded to the subscribers on receiving the response.

15 Claims, 25 Drawing Sheets

(51) Int. Cl.
 H04L 12/58 (2006.01)
 G06F 9/54 (2006.01)
(52) U.S. Cl.
 CPC .............. *H04L 51/12* (2013.01); *H04L 51/24* (2013.01); *H04L 67/10* (2013.01); *H04L 67/1008* (2013.01); *H04L 67/327* (2013.01); *G06F 2209/548* (2013.01)

(56) References Cited

U.S. PATENT DOCUMENTS

| | | | |
|---|---|---|---|
| 9,313,153 B2 | 4/2016 | Cullen | |
| 9,652,307 B1 | 5/2017 | Soman et al. | |
| 10,135,958 B2 | 11/2018 | Mamas | |
| 10,681,164 B2* | 6/2020 | Ruiz-Meraz | H04L 12/1859 |
| 10,866,844 B2* | 12/2020 | Banisadr | G06F 16/958 |
| 2003/0208545 A1 | 11/2003 | Eaton et al. | |
| 2004/0098459 A1* | 5/2004 | Leukert-Knapp | G06Q 99/00 |
| | | | 709/206 |
| 2004/0205142 A1* | 10/2004 | Bahr | G06F 9/542 |
| | | | 709/207 |
| 2005/0021843 A1 | 1/2005 | Duigenan et al. | |
| 2006/0155581 A1* | 7/2006 | Eisenberger | G06F 16/958 |
| | | | 705/3 |
| 2008/0065652 A1* | 3/2008 | McCann | H04L 67/1034 |
| 2008/0177994 A1* | 7/2008 | Mayer | G06F 9/4418 |
| | | | 713/2 |
| 2011/0225229 A1 | 9/2011 | Srivastava et al. | |
| 2011/0307603 A1* | 12/2011 | Ishikawa | G06Q 30/02 |
| | | | 709/224 |
| 2012/0102503 A1 | 4/2012 | Meijer et al. | |
| 2012/0191856 A1 | 7/2012 | Chen et al. | |
| 2012/0215856 A1* | 8/2012 | Beardsmore | H04L 51/26 |
| | | | 709/206 |
| 2013/0065526 A1* | 3/2013 | Pottier | H04W 4/80 |
| | | | 455/41.2 |
| 2013/0066866 A1* | 3/2013 | Chan | G06F 16/335 |
| | | | 707/732 |
| 2013/0198308 A1* | 8/2013 | Yang | H04L 51/14 |
| | | | 709/206 |
| 2013/0339448 A1 | 12/2013 | Kahan et al. | |
| 2014/0195622 A1 | 7/2014 | Cullen | |
| 2014/0280398 A1 | 9/2014 | Smith et al. | |
| 2016/0191340 A1 | 6/2016 | Anakkot et al. | |
| 2017/0068578 A1 | 3/2017 | Baskaran et al. | |
| 2017/0109995 A1 | 4/2017 | Ueno et al. | |
| 2017/0161282 A1 | 6/2017 | Kemme et al. | |
| 2018/0270310 A1 | 9/2018 | Venkatesan et al. | |
| 2018/0316641 A1 | 11/2018 | Mankovskii | |
| 2019/0058660 A1* | 2/2019 | Ruiz-Meraz | H04L 63/0227 |
| 2019/0058772 A1* | 2/2019 | Ruiz-Meraz | H04L 45/306 |
| 2020/0220941 A1* | 7/2020 | Ruiz-Meraz | G06F 9/542 |

OTHER PUBLICATIONS

"International Search Report & Written Opinion Issued in PCT Application No. PCT/US2018/039626", dated Sep. 13, 2018, 14 Pages.

"International Search Report & Written Opinion Issued in PCT Application No. PCT/US2018/039629", dated Sep. 7, 2018, 13 Pages.

"International Search Report & Written Opinion Issued in PCT Application No. PCT/US2018/039630", dated Oct. 2, 2018, 12 Pages.

"Non Final Office Action Issued in U.S. Appl. No. 15/907,032", dated Jun. 27, 2019, 8 Pages.

"Non Final Office Action Issued in U.S. Appl. No. 15/906,902", dated Jul. 25, 2019, 11 Pages.

"Final Office Action Issued in U.S. Appl. No. 15/907,001", dated Apr. 17, 2020, 21 Pages.

"Non Final Office Action Issued in U.S. Appl. No. 15/907,001", dated Nov. 1, 2019, 20 Pages.

"Final Office Action Issued in U.S. Appl. No. 15/907,032", dated Nov. 29, 2019, 8 Pages.

\* cited by examiner

MANAGING SUBSCRIPTIONS FOR EVENT NOTIFICATIONS

CLAIM FOR PRIORITY

The present application claims the benefit of priority to U.S. Provisional Application Ser. No. 62/545,806 having the title "EVENT GRID" filed on Aug. 15, 2017, the disclosure of which is hereby incorporated by reference in its entirety.

BACKGROUND

In order to stay updated with fast-changing trends in technology, it may be helpful to keep a track of events or changes occurring with regard to the operation of systems implemented across various industries. For example, a system may relate to Internet of Things (IoT) applications and users may subscribe to obtain updates pertaining to any changes in such applications. From the perspective of service providers, they prefer to maintain their customer base by keeping them aware of their developments. Conventionally, there are monitoring applications available to interact with the systems and provide appropriate information to the users who have subscribed for the information. However, all events of a system may not be relevant to a user and, therefore, the user may not prefer receiving updates of all the events of the system.

Furthermore, a large amount of data traffic has to be handled to ensure that appropriate updates of the systems can be provided to the subscribers. Handling such large data traffic can lead to operational issues, as it may be difficult to manage the data traffic for such a large amount of information in order for the system to operate effectively. In a typical message pub-sub system, a publisher publishes messages to a topic and there may be one or more subscribers that are interested in such messages. A subscriber may register interest for all the messages or a subset of the messages specifying some filtering criteria. Such systems are typically implemented by routing all the messages of a topic to a process such as, for example, a broker process, and the broker process may evaluate subscription filters for each message and forward the matched messages to the corresponding subscriptions.

Such a system may work well with a low volume of messages and a low number of subscriptions. However, there may be scenarios where it may be beneficial to have thousands of subscriptions for a topic. For example, in case of a weather application where each weather application instance registers interest for a few places, if each application instance is modeled as a subscriber to a weather topic, then the broker process may match each incoming weather update against those registered weather subscriptions. However, as the weather application becomes more popular, the number of subscribers would go up and the computation required for filtering for each message may increase proportionately. Such computing limitations may also restrict a number of messages to be handled by a topic, even in the case of a lower number of subscriptions. In order to mitigate the computing limitation, the system may have multiple topics and limit each topic to a maximum number of subscriptions. However, even this feature may place additional computational burdens on both the publisher and subscriber application.

An event grid may be a backplane to provide events routing service that receive information about an event and publish the received information to the intended recipients. In an example, the event grid may manage routings of all the events coming from different sources and route them to different destinations. With the event grid, one can subscribe to an event occurring in a resource or event source and get notification for the same. Generally, then event grid may be organized in a cluster of event grid nodes. The events may be provided to the subscribers through event grid nodes which function independent of each other. An event grid node may be understood as a virtual machine where an event grid host runs. A publisher may send the events to any of the event grid nodes. Each node may receive published events, filter the received events to match the events to their intended recipients, and publish the matched events.

Furthermore, each region may have a set of clusters. A given region may be paired to another region that may be geographically near to the given region for availability, reliability, and load balancing at the region level. However, the publishers may send the events at variable rates that may lead to resource exhaustion in the event grid. Such publishers may impact the performance of the event grid for other publishers as well. In such situations, the nodes may be overloaded, under-loaded, or unavailable. Under-loading or over-loading of a node may indicate that the load is unbalanced among nodes and, therefore, hamper the performance of the event grid.

Additionally, owing to the large data traffic, there exists a possibility of breakdown of the monitoring application. Moreover, in case of such breakdown, the monitoring application may lose out on the data traffic during the duration of the breakdown and therefore, the users may not receive the updates. Also, when the subscriber is permanently unavailable, intermittently unavailable, intermittently failing, or permanently failing, the event cannot be delivered to the subscriber. There is therefore a need for technical solutions that scale an event notification system for large amounts of data while at the same time maintaining the reliability of the event notification system.

BRIEF DESCRIPTION OF THE DRAWINGS

Features of the present disclosure are illustrated by way of example and not limited to the following Figure(s), in which like numerals indicate like elements.

DETAILED DESCRIPTION

Figure 1:
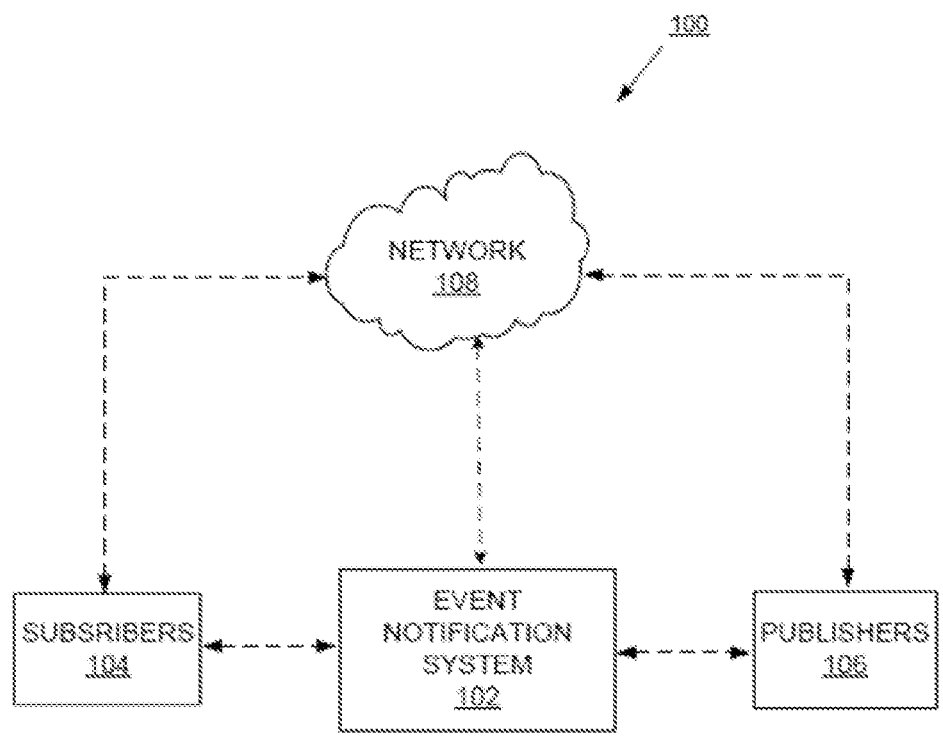
FIG. 1 illustrates an environment for implementation of a system for dispatching targeted event notifications to subscribers, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

Various implementations of the present disclosure describe one or more systems and methods for retrieval of events from various sources and their targeted event notifications to subscribers. Although the overview is explained with respect to one of the systems of the present disclosure, the overview is equally applicable to other implementations, without departing from the scope of the present disclosure.

In an example embodiment, an event notification system, hereinafter referred to as a system, for retrieval of events from various sources and their targeted event notifications to subscribers is disclosed. An event may be understood as a change occurring in a source. The event may include information, such as a source of the event, a time stamp indicating a time of occurrence of the event, and a unique identifier. In an example, an event of a new file being created in a storage device may indicate details of the new file and corresponding metadata. Further, an event of rebooting of a virtual machine may indicate, but is not limited to, information of the virtual machine and a reason for reboot. In an example embodiment, an event may be understood as anything a user may wish to receive notifications of, for example, "Creates", "Reads", "Updates", and "Deletes" of resources, such as the virtual machine or a file in storage, a new message in a queue, a tweet, or a change in a stock ticker. In an example embodiment, the events may be categorized as topics based on their corresponding type. The topics may provide an event schema for consumption of the events by the subscribers. The events may be published to the topics, which may then be notified to the subscribers of the topics.

Furthermore, in an example embodiment, the source may be understood as a system where events occur, for example, a storage platform for creation of blobs and a virtual machine platform for virtual machine events. Such sources may publish the events to the system.

In addition, a subscriber may be understood as a user who has authorized the system to deliver notifications pertaining to the events to the user. In an example embodiment, systems or persons pushing the events to the system may hereinafter be referred to as publishers. After receiving events from the publishers, the system may then push the events to the subscribers with WebHooks, queues, and Event Hubs as endpoints. The system may support multiple types of the subscribers and may follow different techniques to deliver an event, based on the subscriber. For example, in case the subscriber is Webhook, the event may be considered delivered when a status code of the subscriber is 200—OK. In an example, when the source being a queue of a storage platform, an event may be considered delivered until the storage platform successfully process the delivery of the event into the queue.

In particular, the system may receive, store, route, filter, and multicast the events to destinations through event grid subscriptions, interchangeably referred to as subscriptions. A subscription may be understood as a user-configured entity, which may direct appropriate set of events from a publisher to a subscriber. In an example embodiment, the subscriptions may filter the events based on a resource path of origination of the event as well as a type of event.

Therefore, the system may be understood as publisher-subscriber system that includes an event grid, which is an event backplane that enables event-based programming with publisher-subscriber semantics and reliable distribution and delivery for all services.

In an example embodiment, the system may have an event grid having edge nodes arranged in a horizontal structure, and may not depend on any other data repository for storing the events. The subscriptions may be stored close to the edge nodes so that the system may conveniently route the traffic through the edge nodes to the subscriptions. By making such a horizontal edge-based structure, the system may move routing decisions from a core or central hub of the system to the edge nodes. A routing table may be installed at each of the edge nodes rather than at the core, which may help in speeding up the routing. In an example embodiment, the routing table may be installed at the core or the hub, and appropriate portions of the routing table may be installed or moved from the core to the edge nodes. The system may filter the events at the edge nodes and route them from the edge nodes towards the subscribers, based on the portions of the routing table installed at the corresponding edge nodes.

In an example embodiment, the system may filter the events in order to scale a number of events received by the system as well as a number of subscriptions that may be potential targets for receiving corresponding notifications. In an example embodiment, as a part of the filtering process, the system may perform a comparison among the events by a fast lookup technique using a hash-table. For example, the system may determine one or more hashes for different source destinations and may categorize the events as packets of events matching with the corresponding hashes. Furthermore, the system may create one or more prefixes and may filter the events based on the prefixes. The system may identify the events that match with each of the prefixes and categorize the events accordingly.

The system may then route the filtered events to the subscribers through a partition-out routing model. In an example, the partitioning-out routing model may be understood as a model where a subject associated with an event may be partitioned and only a prefix is used to traverse the nodes. The system may manage the routes and may forward the events to the edge nodes in the partition-out model, based on the subscribers or demand of the subscribers. In an example embodiment, the system may develop prefix-based routing for the events in order to make a hierarchical route structure. In an example embodiment, the system may route the events among different clusters, based on routing tables. In an example embodiment, the system may generate a routing table for a specific region. In such an example embodiment, any change in the routing table may be replicated in each cluster of the region. In an example embodiment, the routing table may include details pertaining to retrieval of information from each cluster by every node in the edge nodes on demand. The system may determine a route for data from a region to a cluster to an edge. In an example embodiment, the system may use applications, such as "service fabric" for triple replication of changes in the events.

The system may manage the operation of each of the edge nodes based on the data traffic. As may be understood, the event grid may include a set of clusters. Each cluster may further have a filtering table. An edge node may retrieve a demanded portion of the filtering table from the corresponding cluster. The system may continuously determine occupancy of the edge nodes. In an example embodiment, the system may determine that an edge node may be saturated, i.e., overloaded with the data traffic. In such an example embodiment, the system may stop routing the data to the edge node till the load on the edge decreases to a predetermined threshold.

In an example embodiment, the system may allow a user to select one or more events through an application such as, for example, a resource manager application. The system may then deliver notifications corresponding to the selected events to the user. Therefore, the system may allow the user to receive the notifications by using a single gesture. The system may offer an authorization model for a source of the events selected by the user. In an example embodiment, the resource manager application may participate and collaborate with the event grid as well as the event source.

Further, the system may also ensure that the data traffic is handled properly in order to deliver the notifications to the subscribers. The system may update a routing plan based on an operational status of the edge nodes. For example, if an edge node is not operational for some time, the system may divert the data traffic of such edge node to other edge nodes that are operational. In an example embodiment, the system may include instant queues that will be populated with new events to be delivered to the subscribers. The system may also include a number of delayed queues. In an example embodiment, when the delivery of a notification corresponding to an event fails, the event or the notification may be queued up in a delayed queue. The delayed queue may list the notifications for which the delivery may have to be attempted after 10 seconds of the failure.

In an example embodiment, the system may maintain other delayed queues of queuing up the notifications for which the delivery may have to be attempted after 30 seconds, 1 minute, and 1 hour. Therefore, if the notification lined up in the delayed queue for attempt after 10 seconds also fails; the notification may be lined up in the delayed queue of 30 seconds. In such a manner, the notification may be lined up in different queues with different attempt time duration until the notification is eventually delivered to the subscriber. In an example embodiment, the system may drop a notification that is not delivered within 24 hours after the first failure of delivery. In an example embodiment, the system may include a probation list of edge nodes that stop working due to any reason. Once an edge node becomes operational again, the system may remove the edge node from the probation list.

The system of the present disclosure offers an approach of retrieving the events from the publishers and targeted event notifications to the subscribers. By providing services with out-of-the-box push-push capabilities, the system eliminates the need for widespread long polling for changes. Therefore, the services and the subscribers may not need to balance a cost of continuous polling with the latency of widely spaced polling. Furthermore, the system aims to deliver the events with sub-second latency, i.e., services and user applications can react to the events in real-time.

Also, because the system offers a universal backplane, the system may not need to build customer one-off connections between each other as the preferred method of connecting services within system. Additionally, when a service is connected as a subscriber, it may now receive consumer events from any other service.

The disclosed system with a horizontal edge node based structure may ensure an effective distribution of events among the edge nodes and therefore, the data traffic is appropriately handled. Further, the system may filter and route the events considering a variety of factors, such as categories of filtering and the operational status of the edge nodes. One of ordinary skill in the art will appreciate that the present disclosure offers a fairly comprehensive, flexible, accurate, effective, intelligent, and proactive technology-based approach for retrieval of the events from the publishers and targeted event notifications to the subscribers.

FIG. 1 illustrates an environment 100 for implementation of the system 102 for targeted event notifications of the events to the subscribers 104, according to an example embodiment of the present disclosure. The system 102 may receive the events from publishers 106.

The publishers 106 may include, but are not limited to, a storage platform, an SQL platform, an IoT hub, a data lake storage system, an API management system, an active directory, a document database, and an event hub. The system 102 may receive the events from the publishers 106. The system 102 may store, route, filter, and then distribute the events to the subscribers 104, based on subscriptions. Further, in an example embodiment, the subscribers 104 may include, but are not limited to, websites. Some examples of the websites are shown in FIG. 1 for clarity purposes, and should not be construed as limiting. The system 102 may be in communication with the publishers 106 and the subscribers 104 through a network 108. The network 108 may be a wired network or a wireless network. The constructional and operational details of the system 102 are explained in detail in the description of FIG. 2.

Figure 2:
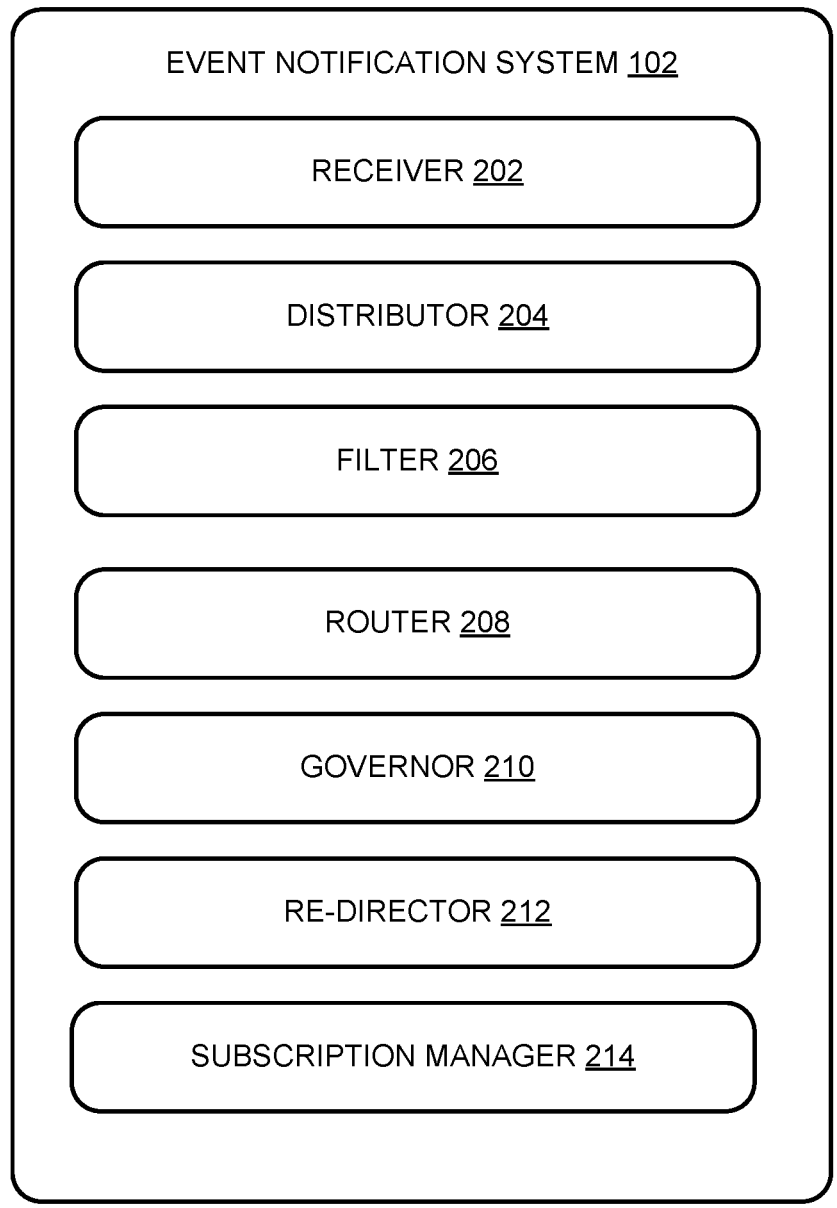
FIG. 2 illustrates a block diagram of the system, according to an example embodiment of the present disclosure.

FIG. 2 illustrates a block diagram of the system 102, according to an example embodiment of the present disclosure. The system 102 may include a receiver 202, a distributor 204, a filter 206, a router 208, a governor 210, a re-director 212, and a subscription manager 214. The receiver 202, the distributor 204, the filter 206, the router 208, the governor 210, the re-director 212, and the subscription manager 214 may be in communication with each other.

The receiver 202 may receive the events from the publishers 106. In an example embodiment, the receiver 202 may receive the events in real-time. Upon receipt of the events by the receiver 202, the distributor 204 may distribute the events among various nodes in order to balance the load of the events. The filter 206 may filter the events received based on subscriptions corresponding to the subscribers. The router 208 may dispatch notification for the filtered events to the subscribers. The re-director 212 may retransmit the notifications that are not successfully transmitted to the subscribers. The governor 210 may handle the resources available within the system 102 to process a request. The subscription manager 214 may manage subscription added or deleted by the subscribers by communicating with event sources.

Figure 3:
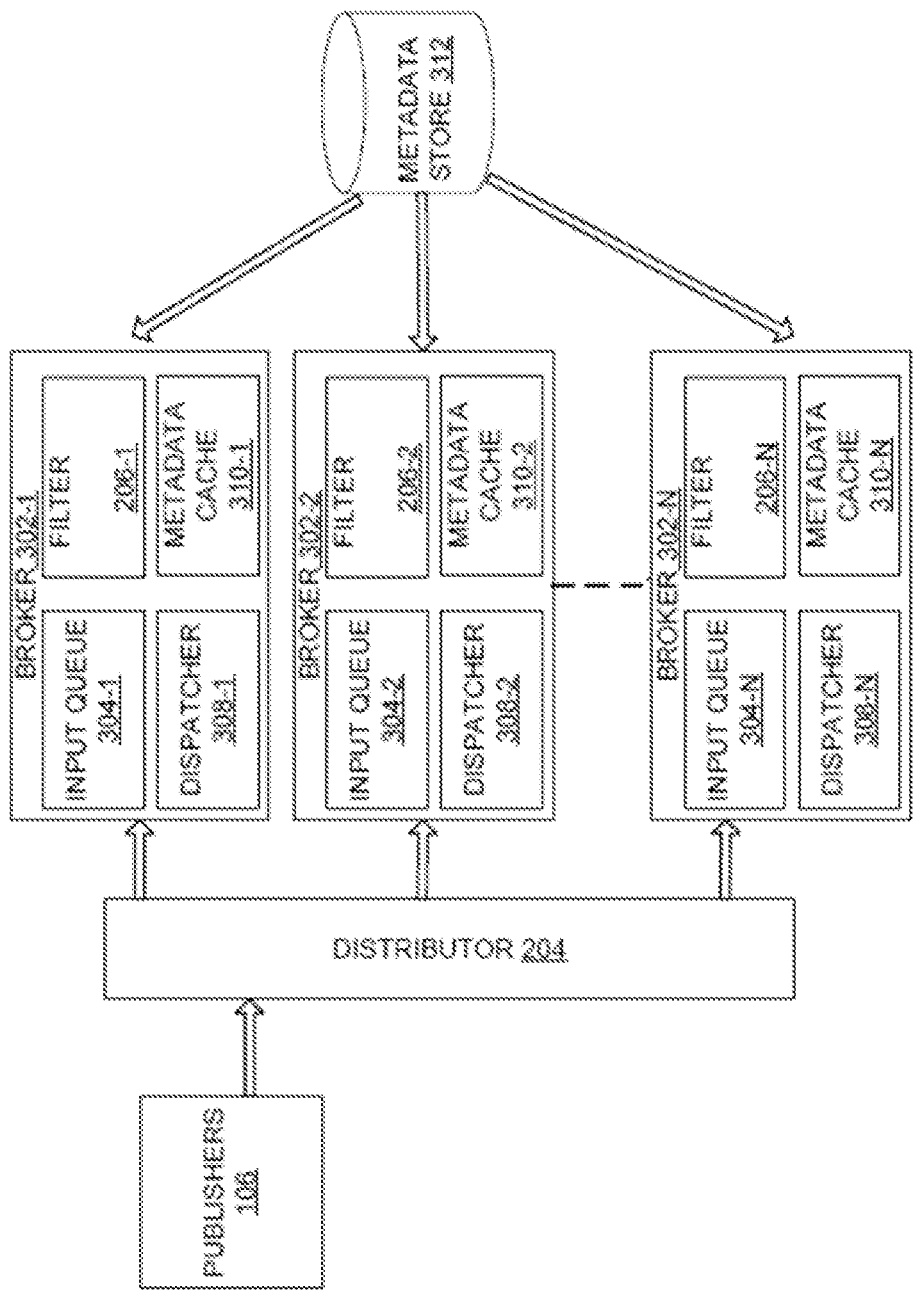
FIG. 3 illustrates distribution of the events by a distributor of the system by allocating multiple brokers to process a topic of the events, according to an example embodiment of the present disclosure.
Figure 4:
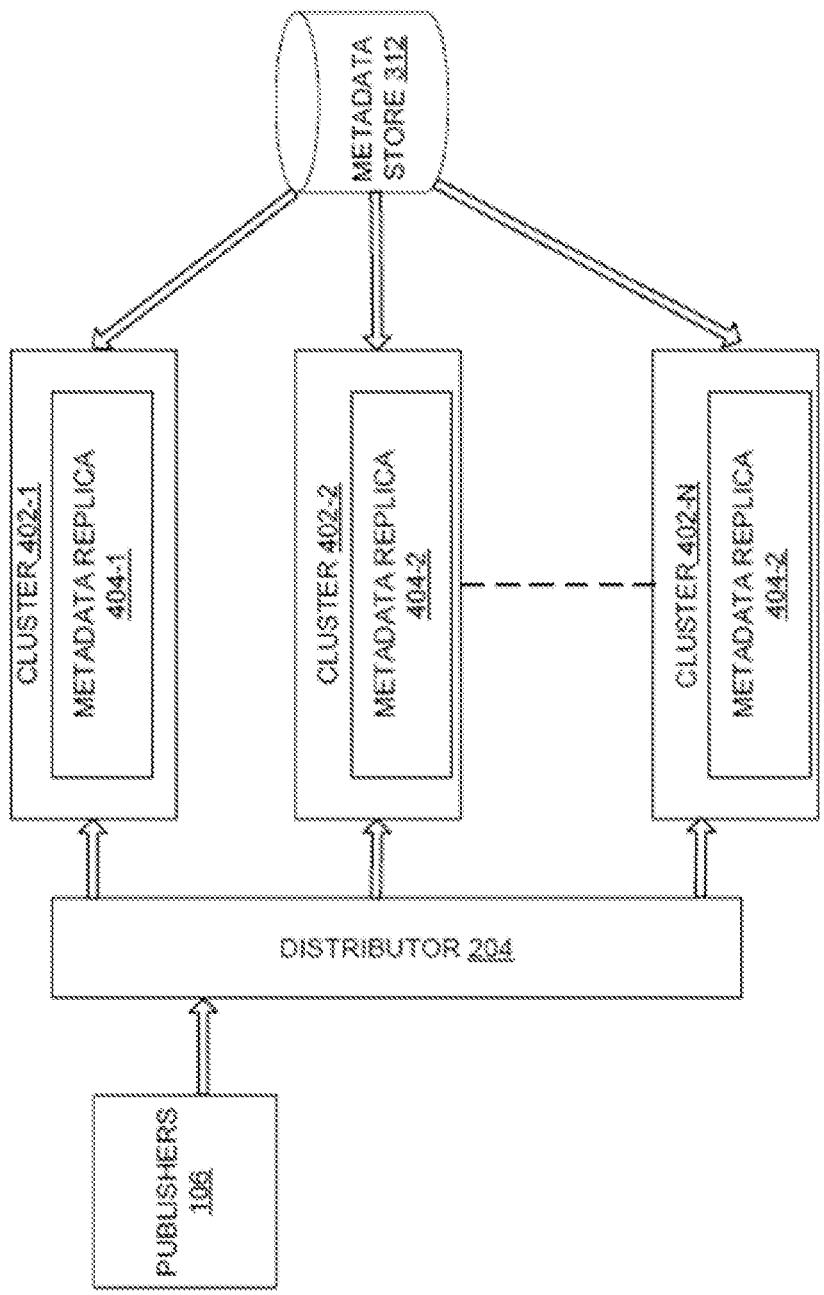
FIG. 4 illustrates distribution of the events by the distributor by adding compute clusters in the system, according to an example embodiment of the present disclosure.

FIG. 3 and FIG. 4 illustrate distribution of the events by the distributor 204 of the system 102 for balancing the load of the events, according to an example embodiment of the present disclosure. In particular, FIG. 3 illustrates the distribution of the events by the distributor 204 by allocating multiple brokers 302 to process a topic of the events, according to an example embodiment of the present disclosure. The distributor 204 may be understood as a load balancer. In an example embodiment, the distributor 204 may directly receive the events from the publishers 106. The distributor 204 may distribute the events among the multiple brokers 302, individually referred to as a broker 302-1, a broker 302-2, and a broker 302-n. A broker 302 may be understood as a service component in the system 102 that may provide a pub-sub functionality including providing a topic endpoint for posting the events. The broker 302 may authorize and authenticate the publishers 106, evaluate the filtering criteria, and dispatch the matched events to the subscribers 104.

The broker 302-1 may include an input queue 304-1, a filter 206-1, a dispatcher 308-1, and a metadata cache 310-1. Further, the broker 302-2 may include an input queue 304-2, a filter 206-2, a dispatcher 308-2, and a metadata cache 310-2. Similarly, the broker 302-N may include an input queue 304-N, a filter 206-N, a dispatcher 308-N, and a metadata cache 310-N. The input queue 304-1, the input queue 304-2, and the input queue 304-N may collectively be referred to as input queues 304. The filter 206-1, the filter 206-2, and the filter 206-N may collectively be referred to as filters 206. The dispatcher 308-1, the dispatcher 308-2, and the dispatcher 308-N may collectively be referred to as dispatchers 308. The metadata cache 310-1, the metadata cache 310-2, and the metadata cache 310-N may collectively be referred to as metadata cache 310. The brokers 302 may further be in communication with a metadata store 312. The following description is explained with respect to one of the brokers 302, i.e., the broker 302-1, but would be equally applicable to other brokers 302 a well, without departing from the scope of the present disclosure.

In an example embodiment, the distributor 204 may distribute incoming publisher requests or connections or the events among the brokers 302 in a round-robin fashion. In an example embodiment, each broker 302 may include CPU usage as a factor for load balancing.

The broker 302-1 may receive a publish request from the publishers 106 through the distributor 204. In an example embodiment, the publish request may include, but is not limited to, information identifying a recipient topic and one or more messages or events in body of the publish request. The distribute 204 may determine whether the topic exist in a list of topics handled by the broker 302-1. The publish request may also include information pertaining to authorize and authenticate the publisher 106. The broker 302-1 may determine whether a corresponding topic exists and may then validate authentication credentials. The information may be a part of metadata of the topic and the broker 302-1 may query the metadata store 312 and cache the information for reuse.

After authorizing and authenticating the publish request, the messages may be persisted to a persistent store (not shown) for higher reliabilities. The persistent store may include, but is not limited to, a local disk or an external disk to other storage systems. The distributor 204 may form the queues of the events based on an order of receipt of the events based on the validation. The input queue 304-1 may operate for in-memory messages as well. The input queue 304 may line up the received messages and act as an intermediate storage for the messages.

The filter 206-1 may read the messages from the input queue 304-1 and evaluate the filtering criteria against the subscriptions. If a number of subscriptions per topic are limited, the broker 302-1 may download the subscriptions for a given topic and cache the subscriptions. In such a case, the filtering may be done by the filter 206-1. In order to support thousands or even millions of subscriptions for a topic, the metadata store 312 may satisfy a subset of the filtering criteria and return a subset of subscriptions.

The filtered messages may then be forwarded to the dispatcher 308-1. The dispatch of the message by the dispatcher 308-1 may include compute resources, and may be proportional to the amount of the traffic received by the broker 302-1. In case of the traffic being balanced, the dispatcher 308-1 may dispatch the messages in a distributed manner.

The metadata store 312 may serve the topics and subscribers' metadata to the brokers 302 on demand. In an example embodiment, the metadata store 312 may store information pertaining to the provisioned topics, authorized publishers for a topic, the subscribers 104 for the topics with corresponding message filters. Further, the metadata store 312 may expose an RPC protocol and may not have to be co-located with the broker 302. The metadata store 312 may eliminate the need to have a strong association of a topic with a broker node and facilitates on-demand metadata lookups.

Further, in the metadata cache 310-1, in-memory cache lookups are way more effective than RPC look ups in the metadata store 312. For a high-volume message processing system, the metadata cache 310-1 may play a vital role in keeping request latencies small. Therefore, the broker 302-1 may cache the information of the metadata store 312 in memory to minimize the RPC look ups. The metadata cache 310-1 may operate in synchronization with the metadata store 312, by periodic expiring caches and by performing RPC calls for cache misses.

In an example embodiment, when a topic is getting traffic over multiple connections, the distributor 204 may spread the load to the brokers 302 and may achieve scale out. The scaling out may also be achieved for multiple topics with connection balancing across machines. In an example, there may be 5 brokers 302 and 30 topics that are active and have varying amount of load. In an example embodiment, higher load is also normally associated with higher amount of connections and therefore, balancing the connections would also spread the load across brokers 302. Further, as the service gets more customers and more usage, an overall load on the system 102 may increase as well. In such case, adding more compute nodes to a cluster may be sufficient.

FIG. 4 illustrates the distribution of the events by the distributor 204 by adding compute clusters 402 in the system 102, according to an example embodiment of the present disclosure. For the sake of brevity, constructional and operational details of the system 102 that are already explained in the description of FIG. 1, FIG. 2, and FIG. 3 are not explained in detail in the description of FIG. 4.

The distributor 204 may be understood as a traffic manager. The clusters 402 may individually be referred to as a cluster 402-1, a cluster 402-2, and a cluster 402-N. The cluster 402-1, the cluster 402-2, and the cluster 402-N may include a metadata replica 404-1, a metadata replica 404-2, and a metadata replica 404-N. The clusters 402 may be in communication with the metadata store 312. The metadata store 312 may be centralized into a separate service for performing customer edits. The metadata store 312 may be an authoritative store for the metadata.

Further, the metadata replica 404 may ensure low latency lookup as it is co-located, provide higher availability even if the metadata store 312 is not functional, and may serve high read throughputs without putting a lot of load on the metadata store 312.

In an example embodiment, as the load increases, more clusters 402 may be added in the system 102 when read performance of metadata lookups becomes a bottle neck. Further, introduction of clusters 402 may assist in upgrading codes and giving flexibility in targeting certain amount of traffic to new clusters 402 or restrict the traffic to certain clusters 402.

The distributor 204 may provide the system 102 with the functionality of hosting several brokers 302 or nodes or virtual machines that may further facilitate adding more compute, network, and disk capacity by adding clusters 402. Further, as and when a topic needs more compute, for example, because of high volume of the messages or a large number of the subscriptions, the system 102 may dynamically route the traffic to multiple brokers 302 and serve the messages while maintaining low latencies.

Figure 5:
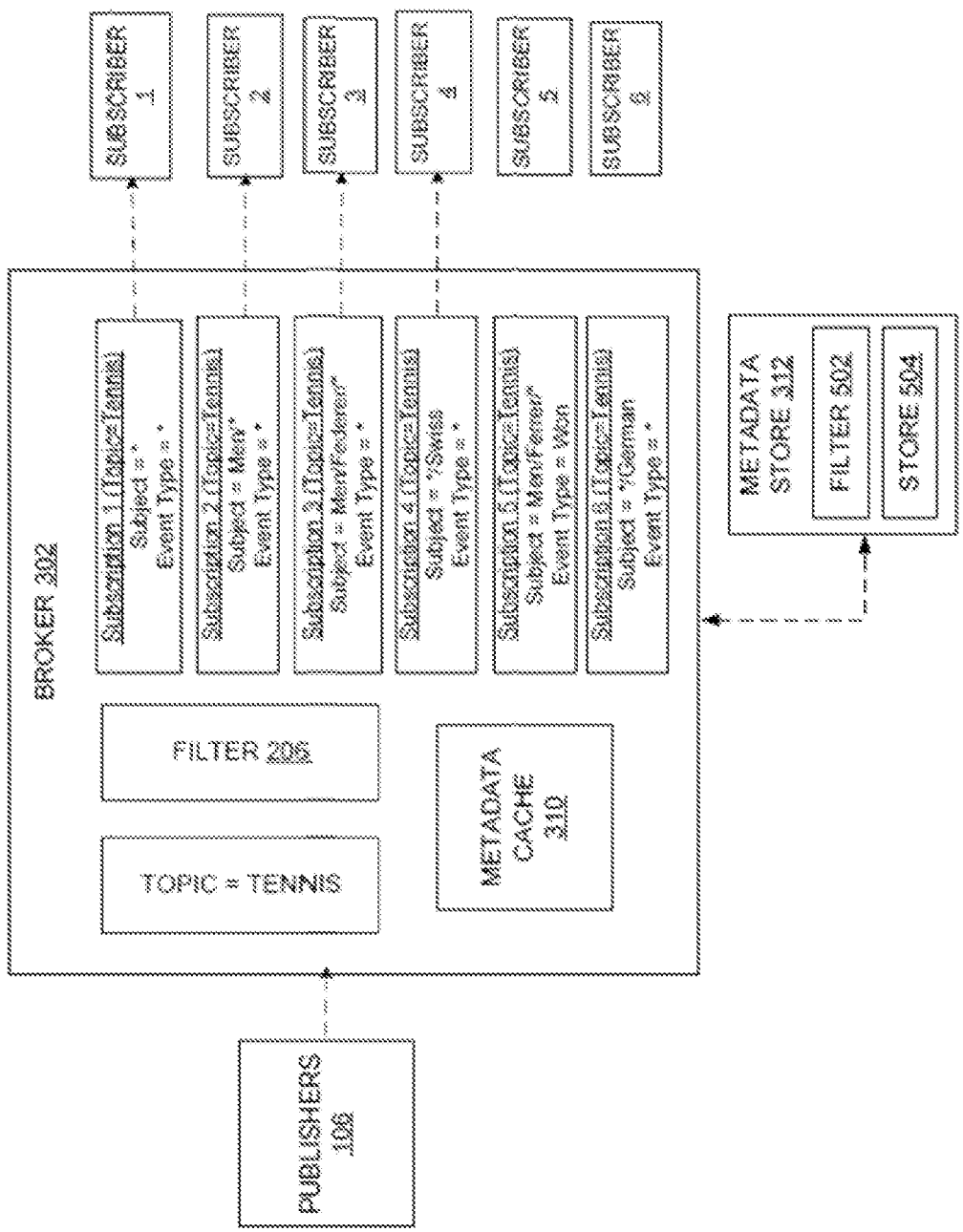
FIG. 5 illustrates filtering of the events by a filter present in the system, according to an example embodiment of the present disclosure.

Referring back to FIG. 2, the filter 206 of the system 102 may filter the events or the messages in order to scale the number of events as well as the number of subscriptions that may be potential targets for receiving corresponding notifications. The router 208 may then route the filtered events to the subscribers. FIG. 5 illustrates the filtering of the events by the filter 206, according to an example embodiment of the present disclosure. For the sake of brevity, constructional and operational details of the system 102 that are already explained in the description of FIG. 1, FIG. 2, FIG. 3, and FIG. 4 are not explained in detail in the description of FIG. 5.

In an example embodiment, the broker 302 may receive the events from the publishers 106. The publishers 106 may produce domain-specific events for a given topic and send the events to the broker 302. Table 1 illustrates an exemplary event, according to an example embodiment of the present disclosure. Table 1 is shown for providing a better clarity and understanding of the present disclosure, and should not be construed as limiting.

TABLE 1

| | |
|---|---|
| Topic | Tennis |
| Subject | Men/Federer/Swiss |
| EventType | Won |
| Data | <Publisher 106-defined object> |

The broker 302 may receive the events from the publishers 106 and write the events to a store 504, multiplex the events to the subscribers 104 based on the criteria defined by the subscriber 104, and ensure that the event is delivered to all interested subscribers 104. The broker 302 may determine the topic of the event as "Tennis". Further, the filter 206 may filter the events based on cached metadata. The broker 302 may include the metadata cache 310. Further, the broker 302 may be in communication with the metadata store 312. In the illustrated example embodiment, the metadata store 312 may include a filter 502 for complete metadata and the store 504. After receiving the event, the filter 502 may discover the subscribers 104 that are interested in being notified of the event.

The broker 302 may further determine the subscriptions 506 based on the events received. The subscriptions 506 may individually be referred to as a subscription 506-1, a subscription 506-2, a subscription 506-3, a subscription 506-4, a subscription 506-5, and a subscription 506-N as illustrated in FIG. 5. The subscriptions 506 and the topic are metadata of the system 102. The events may then be delivered to the subscribers 104. In the illustrated embodiment, the subscribers 104 may individually be referred to as a subscriber 104-1, a subscriber 104-2, a subscriber 104-3, a subscriber 104-4, a subscriber 104-5, and a subscriber 104-N. A subscriber 104 may receive the events from the broker 302 given a set of criteria, for example, the subscriptions 506. In an example embodiment, multiple subscribers 104 may receive the events with the same topic.

In an example embodiment, filtering criteria for the subscriptions 506 may be declared across different axes, such as "Subject Begins With", "Subject Ends With", "Subject Contains", "Data Attributes", and "Event Type". Further, an optional sixth property may be to toggle case-sensitive matching on or off. Table 2 illustrates exemplary subscriptions 506 created on the topic to describe the filtering by the filter 206, according to an example embodiment of the present disclosure. Table 2 is shown for providing a better clarity and understanding of the present disclosure, and should not be construed as limiting. The subscriptions 504 are shown considering that case-sensitive matching of strings are turned off since it is trivial to super-impose case-sensitive string matching on the system 102.

TABLE 2

|  | Subject Begins With | Subject Ends With | Subject Contains | Event Type | Data Attributes | Textual description |
|---|---|---|---|---|---|---|
| Subscription 1 | * | * |  | * |  | All events sent to Topic = Tennis |
| Subscription 2 | Men/* | * |  | * |  | All events for Men's Tennis |
| Subscription 3 | Men/Federer/* | * |  | * |  | All events for Federer |
| Subscription 4 | * | */Swiss |  | * |  | All events for Swiss Players |
| Subscription 5 | Men/Ferrer/* | * |  | Won |  | All events where Ferrer Won |
| Subscription 6 | * | */German |  | Won | Age = 29 | All events where any German aged 29 years has Won |

The system 102 may represent the subscriptions 506 for a given topic in a customized version of a Compact Prefix Tree, with "Subject Begins With" as the property used for searching through the tree for matching the subscriptions 506. The search property may be known as a Node Key in the description below.

Figure 6:
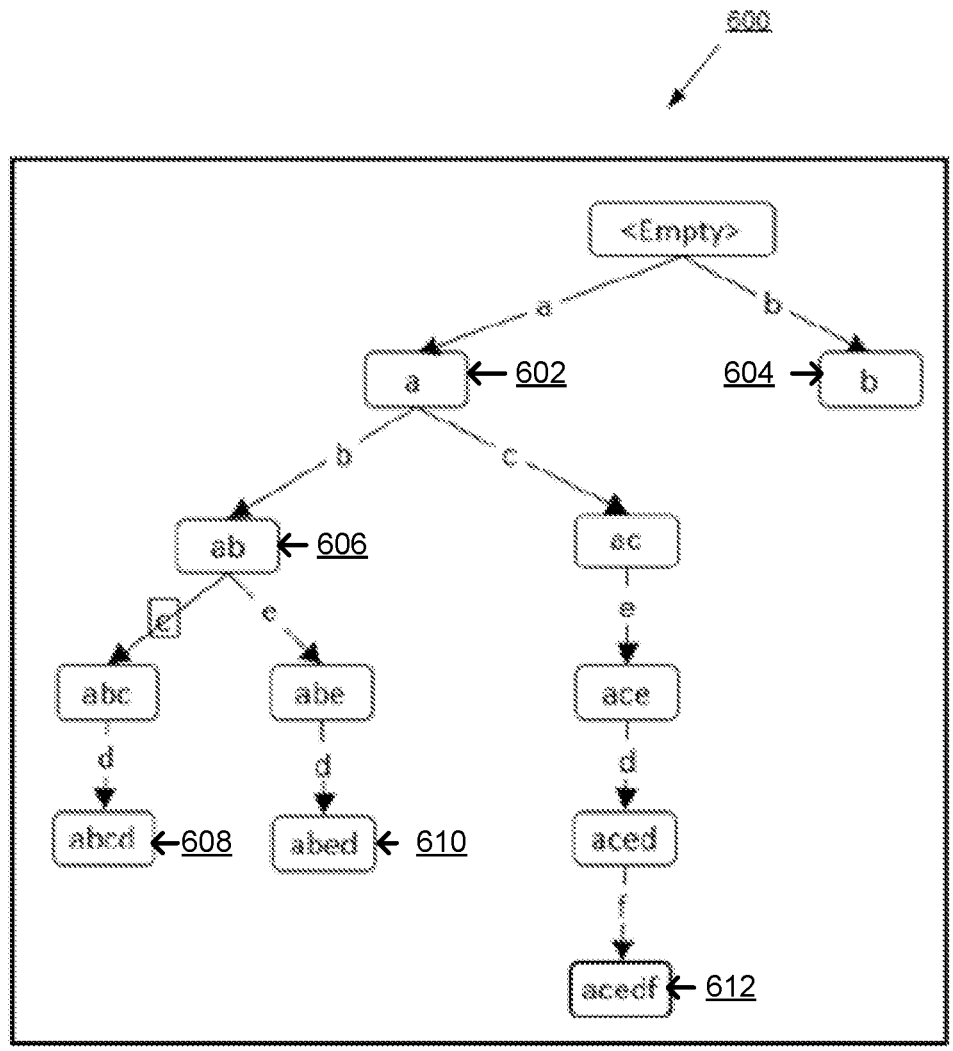
FIG. 6 illustrates a prefix tree, according to an example embodiment of the present disclosure.

FIG. 6 illustrates a prefix tree 600, according to an example embodiment of the present disclosure. The prefix tree 600 is a data structure used to search a set of strings that share common prefixes in less time than a full search on the complete set would take. For example, consider the set of strings "a" 602, "b" 604, "ab" 606, "abcd" 608, "abed" 610 and "acedf" 612 as a dataset that needs to support queries of the form "Is the string "abcd" 608 already in the dataset". A trivial solution may loop over the complete set of strings in the dataset, and perform a string equality check with every set member.

The prefix tree 600 may organize the set of strings into a tree with each edge representing a character, and each node representing a "prefix" of all the strings that are descendants of said node. Any set member that is identical to a given prefix gets stored at the node representing that prefix.

As shown in FIG. 6, boxes are used to represent tree nodes, boxes 602 are used to represent nodes that are also valid set members of the dataset mentioned previously in this section, and boxes 604 are used to represent nodes that are not part of said dataset. Note that the tree starts on a special empty node, which acts as the tree's "root". The strings inside each box are that node's "Key".

Figure 7:
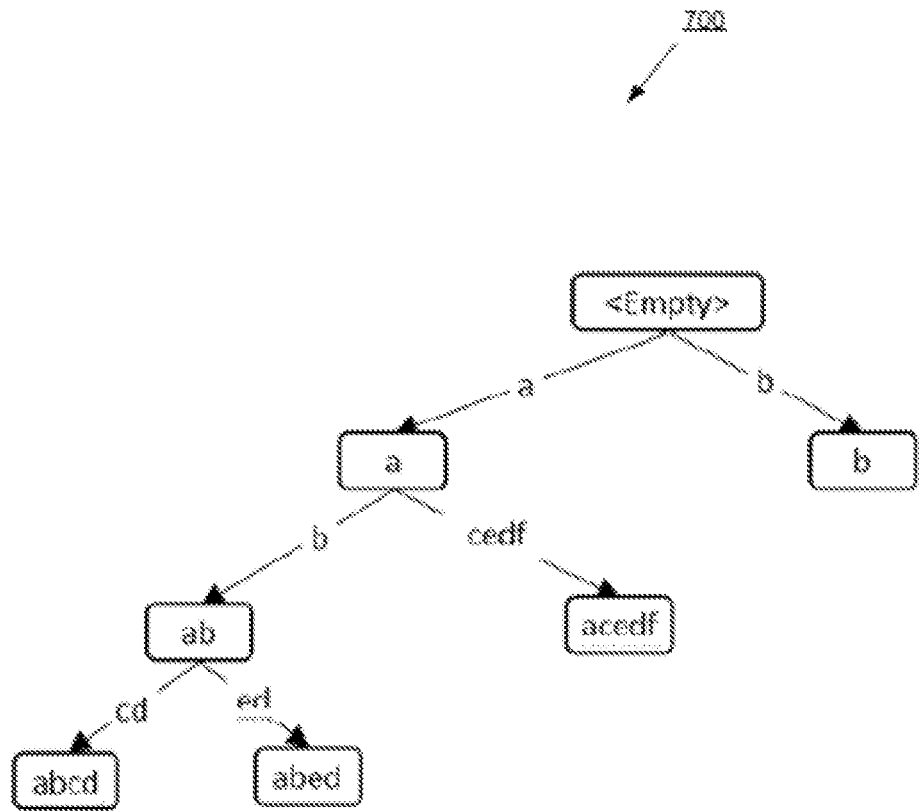
FIG. 7 illustrates a compact prefix tree, according to an example embodiment of the present disclosure.

FIG. 7 illustrates a compact prefix tree 700, according to an example embodiment of the present disclosure. As shown, the number of nodes is much higher than the number of members of the dataset even when some nodes are "empty" and don't have any set members stored on them. The compact prefix tree 700 is an optimization on the prefix tree 600 wherein each path from a node to corresponding child can have more than one character, thus reducing the number of nodes and the space needed to represent such a data structure.

Figure 8:
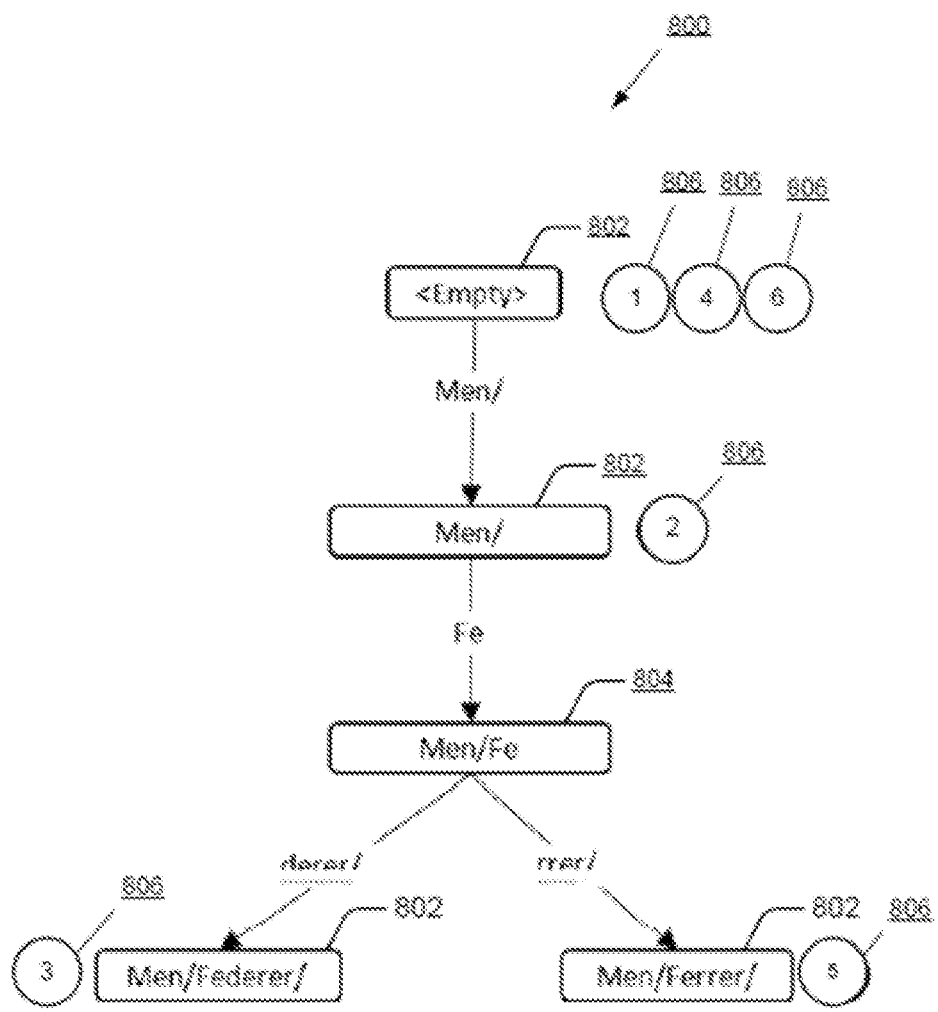
FIG. 8 illustrates a Radix tree, according to an example embodiment of the present disclosure.

FIG. 8 illustrates a Radix tree 800, according to an example embodiment of the present disclosure. The radix tree 800 is illustrated with regard to the subscriptions 506 enlisted in table 1. The radix tree 800 is created with "Subscription→Subject Begins With" as the node key. In FIG. 8, boxes 802 represent tree nodes that correspond to at least one subscription's "Subject Begins With" value. Further, boxes 804 represent tree nodes that may not correspond to any subscription's "Subject Begins With" value. Furthermore, circles 806 with a number inside them are the subscriptions 506 from the table 1 where "Subject Begins With" matches the string value of that node.

In FIG. 8, the subscriptions 506 are only stored on the nodes where the node key exactly matches the subscription's subject property. Further, since the filtering is being performed for the "Subject Begins With" field, the exact match guarantees as provided by prefix trees are not required, and a weaker "begins with" guarantee may be required.

In an example embodiment, for a tree with 10 subscriptions 506 spread across 5 nodes, pointer indirections may navigate from one node to another causing the system 102 to take much longer than storing all the subscriptions 506 on a node, and may iterate over the list linearly and perform a "begins with" check on each element. In an example embodiment, an enhancement of collapsing the subscriptions 506 spread across a sub-tree into the root node of that sub-tree may be performed, if the total number of subscriptions 506 in the sub-tree is under a predefined limit, for example, 10. A node may have the subscriptions 506 whose subject isn't an exact match of the node key. However they are still guaranteed to start with the node key, which is equivalent the "begins-with" filtering.

Figure 9:
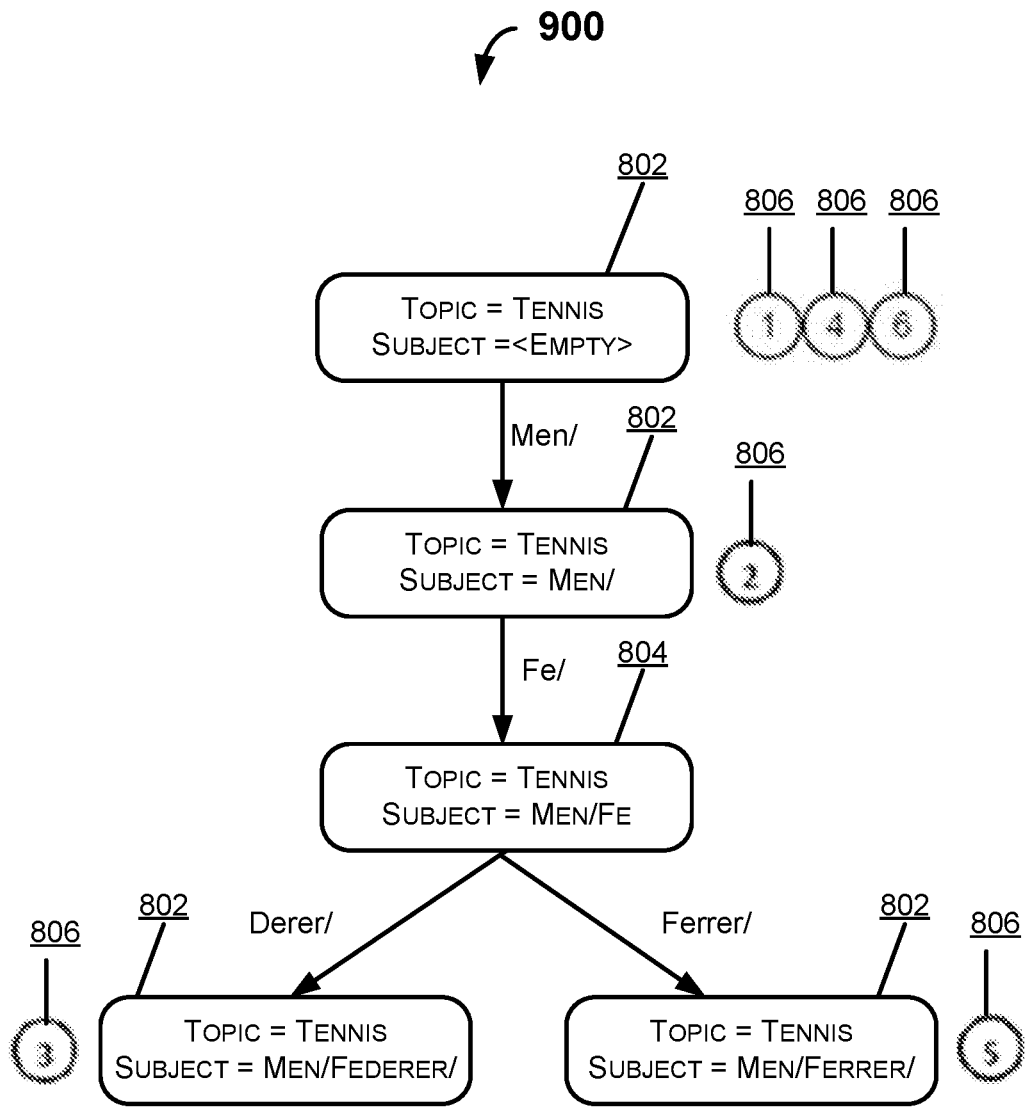
FIG. 9 illustrates a radix tree, according to an example embodiment of the present disclosure.

FIG. 9 illustrates a radix tree 900, according to an example embodiment of the present disclosure. In an example embodiment, the radix tree 900 for a topic with a thousand subscriptions 506 may spread across a hundred nodes, with each subscription 506 taking up 1 KB of space and each Node taking up 1 KB of space, for a total data structure size of 1.1 MB. Therefore, when a new subscription 506 is added or an old subscription 506 is deleted, the system 102 may have to serialize the 1.1 MB and write it to disk. This would result into high load on the underlying storage sub systems. Similarly, when the broker 302 may try to read just one branch of the radix tree 900, the system 102 may have to load up the whole 1.1 MB into memory before being able to navigate the radix tree 900.

In an example embodiment, the only "context" tying a node to its tree is the topic of that tree. The topic may be added to every node to make the node individually addressable, and thus the load on persistence/tree load went down from 1.1 MB to just 2 KB. This would result into more efficient I/O when reading/writing from the persistent store, and less wasted space when caching trees in memory, as now we can cache only the "hot branch" of the radix tree 900 instead of having to cache it completely. The radix tree 900 may also be referred to as fully addressable radix tree 900.

Figure 10:
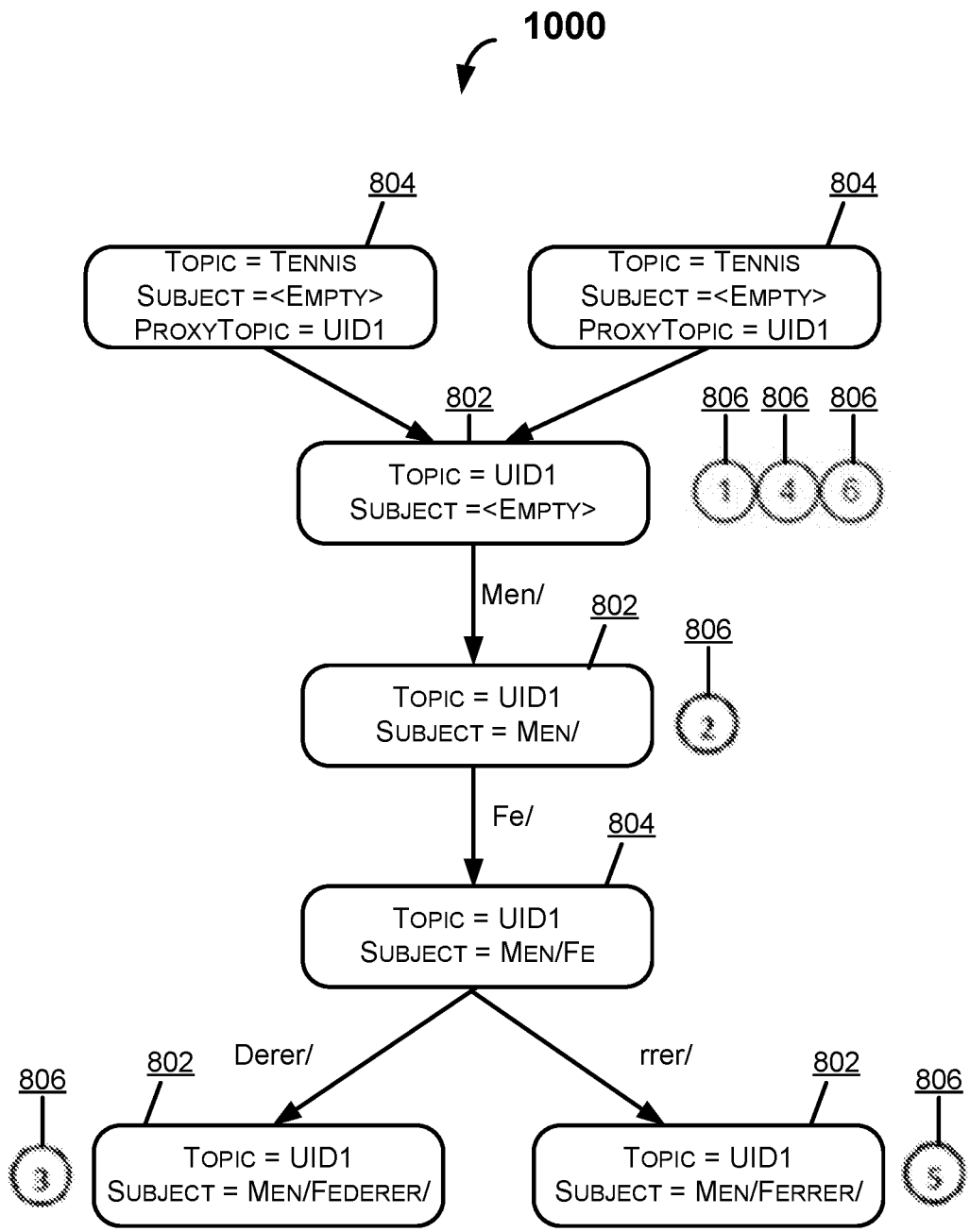
FIG. 10 illustrates a radix tree with a topic renaming functionality, according to an example embodiment of the present disclosure.

FIG. 10 illustrates a radix tree 1000 with a topic renaming functionality, according to an example embodiment of the present disclosure. The filter 206 of the system 102 may use unique IDs instead of the name of the topic on each tree node. The filter 206 may rename topics in an atomic fashion without having to update all the nodes of that tree. In an example embodiment, the filter 206 may rename the nodes when renaming of the topic is performed because addition of the topic property to every node in an effort to make the nodes addressable.

In order to serve 100M subscriptions 506 from a single event grid deployment, the "hot path" of a tree may be cached in memory while also keeping track of when not to query the store when a node is not found in the cache. Further, for ensuring that wasted node queries don't hit the store, the filter 206 may store the node key of the child node on the parent node, instead of storing an object reference to the child node.

In the example as discussed before, when an event with Subject=Men/Nadal/* is received in the system 102, the tree 1000 may be traversed till the node with Key="Men/". There may be one child with Key="Men/Fe", and thus discard the Men/Nadal/* event as not having any matching subscriptions 506. The system 102 may not need to have either the Men/Fe node or its' descendants in the cache to safely say that the Men/Nadal/* search can be halted.

In order to explain an example flow of control in the filter 206 of the system 102, a flow of input events being sent to Topic=Tennis may be considered, with the subscription store having the following entries in it. Note that the metadata cache 310 in the broker 302 may not have any of these entries yet. Table 3 illustrates a list of subscriptions 506 with corresponding details, according to an example embodiment of the present disclosure. Table 3 is shown for providing better clarity and understanding of the present disclosure, and should not be construed as limiting.

Table 4 illustrates details of a fully addressable Radix tree, according to one embodiment of the present disclosure, according to an example embodiment of the present disclosure. Table 4 is shown for providing better clarity and understanding of the present disclosure, and should not be construed as limiting.

TABLE 4

| Node # | Proxy Topic | Topic | Subject Begins With | ChildNodes | Subscriptions |
|---|---|---|---|---|---|
| N1 | UID1 | Tennis | | | |
| N2 | UID1 | LawnTennis | | | |
| N3 | | UID1 | * | {M, Men/} | [S1, S4, S6] |
| N4 | | UID1 | Men/ | {F, Fe} | [S2] |
| N5 | | UID1 | Men/Fe | {d, derer}, {r, rrer} | [ ] |
| N6 | | UID1 | Men/ Federer | {M, Men/} | [S3] |
| N7 | | UID1 | Men/ Ferrer | {M, Men/} | [S5] |

In the description below:
LookupCache(T=Tennis, SB=xyz) implies "Lookup Broker Cache for Topic=Tennis, SubjectBeginsWith=xyz".
LookupStore(T=Tennis, SB=xyz, S=123) implies "Lookup store for all nodes relevant to Topic=Tennis, Subject=123, and only start looking from the node with SubjectBeginsWith=xyz"

For filter event E1 with [Topic=Tennis, Subject=*, EventType=*], the filter 206 may follows the below-mentioned steps.
Step 0: Broker Cache State=Empty
Step 1: Filter(T=Tennis, S=*, ET=*)
Step 2: FilterSB(T=Tennis, S=*, SB=*)
Step 3: LookupCache(T=Tennis, SB=*)
Step 4: No Matches found from local cache
Step 5: Nothing to recurse over
Step 6: No matches found during local filtering
Step 7: FilterSB(T=Tennis, S=*, SB=*)
Step 8: LookupStore(T=Tennis,SB=*)
Step 9: Get N1
Step 10: N1 has a ProxyTopic, Recurse back to Step 8

TABLE 3

| | Subject Begins With | Subject Ends With | Subject Contains | Event Type | Data Attributes | Textual description |
|---|---|---|---|---|---|---|
| Subscription 1 | * | * | | * | | All events sent to Topic = Tennis |
| Subscription 2 | Men/* | * | | * | | All events for Men's Tennis |
| Subscription 3 | Men/Federer/* | * | | * | | All events for Federer |
| Subscription 4 | * | */Swiss | | * | | All events for Swiss Players |
| Subscription 5 | Men/Ferrer/* | * | | Won | | All events where Ferrer Won |
| Subscription 6 | * | */German | | Won | Age = 29 | All events where any German aged 29 years has Won |

Step 8(2): LookupStore(T=UID1,SB=*)
Step 9(2): Get N3
Step 10(2): At the end of S from Step 7, end recursion
Step 11: FilterSB returned the following:
Table 5 illustrates the output of the filter 206 after following the step 1 to the step 11, according to an example embodiment of the present disclosure. Table 5 is shown for providing better clarity and understanding of the present disclosure, and should not be construed as limiting.

TABLE 5

| Node # | Topic | ProxyTopic | Subject Begins With | ChildNodes | Subscriptions |
|---|---|---|---|---|---|
| N1 | Tennis | | | | |
| N3 | | UID1 | * | {M, Men/} | [S1, S4, S6] |

Step 12: Update local cache with N1 and N3
Step 13: Collect S1, S4, S6 from N1 and N3, no more recursion.
Step 14: Apply SubjectEndsWith, SubjectContains, DataAttributes, and EventType checks as defined on Subscriptions S1, S4 and S6, on Event E1.
Step 15: Return S1
Further, for the event E2 [Topic=Tennis, Subject=Women/Hingis/Swiss, EventType=Injured], the filter 206 may follow the below-mentioned steps.
Step 0: Broker Cache State=
Table 6 provides the broker cache state, according to an example embodiment of the present disclosure. Table 6 is shown for providing better clarity and understanding of the present disclosure, and should not be construed as limiting.

TABLE 6

| Node # | Topic | ProxyTopic | Subject Begins With | ChildNodes | Subscriptions |
|---|---|---|---|---|---|
| N1 | Tennis | | | | |
| N3 | | UID1 | * | {M, Men/} | [S1, S4, S6] |

Step 1: Filter(T=Tennis, S=Women/Hingis/Swiss, ET=Injured)
Step 2: FilterSB(T=Tennis, S=Women/Hingis/Swiss, SB=*) Only S1's criteria matches E1
Step 3: LookupCache(T=Tennis, SB=*)
Step 4: Get N1
Step 5: N1 has a ProxyTopic, Recurse back to Step 3
Step 3(2): LookupCache(T=UID1,SB=*)
Step 4(2): Get N3
Step 5(2): N3.ChildNodes has no entry for "W", to match Women; stop recursion
Step 6: Get N1 and N3
Step 7: Skip to Step 13 because we know from N3 that there are no nodes that will have W (Women) in SubjectBeginsWith
Step 13: Collect S1, S4, S6 from N1 and N3, no more recursion.
Step 14: Apply SubjectEndsWith, SubjectContains, DataAttributes and EventType checks as defined on Subscriptions S1, S4 and S6, on Event E2.
Only S1 and S4's criteria matches E2
Step 15: Return S1 and S4
Furthermore, for the event E3 with [Topic=Tennis, Subject=Men/Federer/Swiss, EventType=Won], the filter 206 may follow the below-mentioned steps:

Step 0: Broker Cache State=
Table 7 provides the broker cache state, according to an example embodiment of the present disclosure. Table 7 is shown for providing better clarity and understanding of the present disclosure, and should not be construed as limiting.

TABLE 7

| Node # | Topic | ProxyTopic | Subject Begins With | ChildNodes | Subscriptions |
|---|---|---|---|---|---|
| N1 | Tennis | | | | |
| N3 | | UID1 | * | {M, Men/} | [S1, S4, S6] |

Step 1: Filter(T=Tennis, S=Men/Federer/Swiss, ET=Won)
Step 2: FilterSB(T=Tennis, S=Men/Federer/Swiss, SB=*)
Step 3: LookupCache(T=Tennis, SB=*)
Step 4: Get N1
Step 5: Recurse back to Step 3
Step 3(2): LookupCache(T=UID1,SB=*)
Step 4(2): Get N3
Step 5(2): N3.ChildNodes has entry for "M" mapped to Men/, recurse back to Step 3
Step 3(3): LookupCache(T=UID1, SB=Men/)
Step 4(3): Get special token <NotCached>
Step 5(3): Reached end of cache, stop recursion
Step 6: Get N1, N3 and <NotCached>
Step 7: FilterSB(T=UID1, S=Men/Federer/Swiss, SB=Men/)
Step 8: LookupStore(T=UID1,SB=Men/)
Step 9: Get N4
Step 10: N4.ChildNodes has an entry for "F" mapped to Fe, recurse back to Step 8
Step 8(2): LookupStore(T=UID1,SB=Men/Fe)
Step 9(2): Get N5
Step 10(2): N5.ChildNodes has an entry for "d" mapped to derer, recurse back to Step 8
Step 8(2): LookupStore(T=UID1,SB=Men/Federer)
Step 9(2): Get N6
Step 10(2): N6.ChildNodes has no entry for "/" to match "/Swiss", stop recursion
Step 11: FilterSB returned the following:
Table 8 illustrates the output of the filter 206 after following the step 1 to the step 11, according to an example embodiment of the present disclosure. Table 8 is shown for providing better clarity and understanding of the present disclosure, and should not be construed as limiting.

TABLE 8

| Node # | Topic | ProxyTopic | Subject Begins With | ChildNodes | Subscriptions |
|---|---|---|---|---|---|
| N4 | | UID1 | Men/ | {F, Fe} | [S2] |
| N5 | | UID1 | Men/Fe | {d, derer}, {r, rrer} | [ ] |
| N6 | | UID1 | Men/Federer | {M, Men/} | [S3] |

Step 12: Update local cache with N4, N5 and N6
Step 13: Collect S2, S3 from N4, N5 and N6, no more recursion.

Step 14: Apply SubjectEndsWith, SubjectContains, DataAttributes and EventType checks as defined on Subscriptions S1, S4, S6, S2 and S3, on Event E3.
Only S1, S2, S3, S4 match E3
Step 15: Return 51, S2, S3, S4

Figure 11:
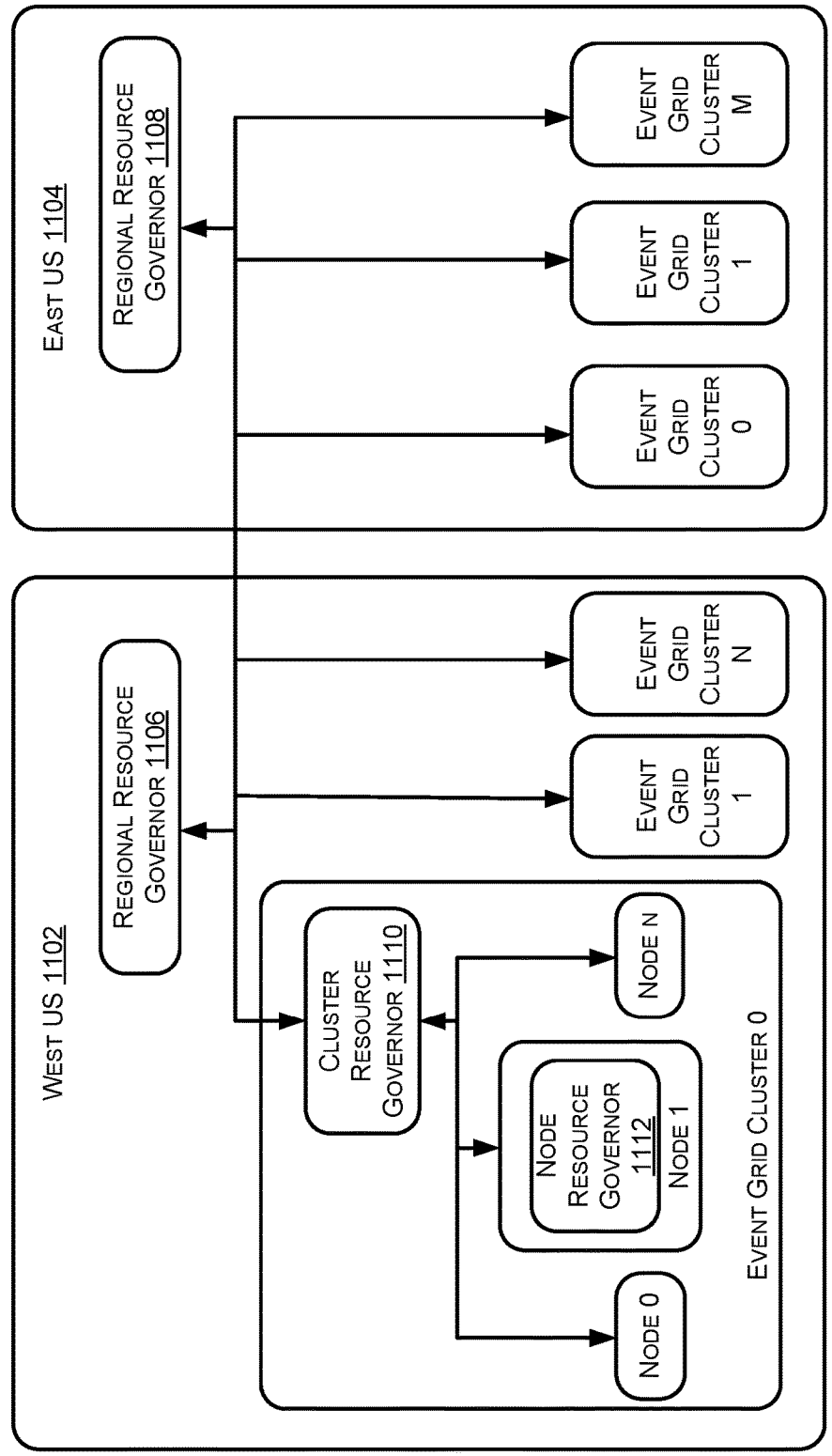
FIG. 11 illustrates a block diagram depicting functionality of a governor of the system, according to an example embodiment of the present disclosure.

FIG. 11 illustrates a block diagram 1100 depicting functionality of the governor 210 of the system 102, according to an example embodiment of the present disclosure. In the illustrated example embodiment, the two different regions are referred to as East US 1102 and West US 1104. The east US 1102 may include an event grid cluster 0, an event grid cluster 1, and an event grid cluster M. Similarly, the West US 1104 may include an event grid cluster 0, an event grid cluster 1, and an event grid cluster M. Further, the event grid cluster 0 of the west US 1104 may include a node 0, a node I, and a node N.

The governor 210 of the system 102 may include a first regional resource governor 1106 and a second regional resource governor 1108 for the west US 1104 and the East US 1102, respectively. Further, the governor 210 may include a cluster resource governor 1110 for the event grid cluster 0 of the west us 1104. Furthermore, the governor 210 may include a node resource governor 1112 for the node I of the west US 1104. In an example embodiment, the first regional resource governor 1106, the second regional resource governor 1108, the cluster resource governor 1110, and the node resource governor 1112 may collectively be referred to as the governor 210.

The governor 210 may collect metrics, for example, node metrics, cluster metrics, and usage metrics to compute decisions that translate to corrective actions for increasing availability, load balancing, and reliability. The node resource governor 1112 may collect and aggregate the metrics. The metrics may include, but are not limited to, a CPU usage, a memory usage, a disk utilization, a publish event receive rate, a publish latency, an end to end latency, a queue length, a number of primary partitions in the node, a subscriber event delivery rate, and a number of incoming and outgoing connection. The publish latency may be understood as time measured from when an event is received to when a response is sent to the publisher. Further, the end to end latency may be understood as time measured from when an event is received to when an event is delivered to a subscriber's endpoint. The queue length may be understood as a count of events that are in queue waiting to be delivered to the subscriber's endpoint.

The node resource governor 1112 may compute decisions and execute actions accordingly. The decisions and the actions may include, but are not limited to, removing the node from the load balancer, which will stop influx of the events to the node, when primary partition is not available in the node. Further, the node resource governor 1112 may execute actions sent by the cluster resource governor 1110 and the first regional resource governor 1106. Such actions may include, but are not limited to, closing connections, capping the publish event receive rate, capping the subscriber event delivery rate, and removing the node from the load balancer. In an example embodiment, the node resource governor 1112 may send the metrics to the cluster resource governor 1110 and the first regional resource governor 1106.

The cluster resource governor 1110 may receive the node metrics from the node resource governors 1112 and aggregate the received metrics. Further, the cluster resource governor 1110 may compute the decisions and send commands with actions to the node resource governor 1112. In an example embodiment, the cluster resource governor 1110 may send a command to a busy node to remove itself from the load balancer, when a node CPU usage is above a predefined threshold value. In an example embodiment, the cluster resource governor 1110 may send commands to the node with busy CPUs to redirect part of corresponding connections to under-loaded nodes, when the node CPU usage is below a predefined threshold value. In an example embodiment, the cluster resource governor 1110 may send a command instructing the node to close a part of corresponding connections, when the node has more connections than other nodes. In an example embodiment, the cluster resource governor 1110 may send commands instructing the nodes to either close connections or remove themselves from the load balancer, when the queue length of the node is above or below a predefined threshold range. Further, the cluster resource governor 1110 may compute decisions and perform actions, such as increasing a number of virtual machines when the nodes are overloaded.

The regional resource governors 1106 and 1108 may send commands to their corresponding node resource governors 1112. In an example embodiment, when the regions, such as the East US 1102 and the West US 1104 are paired, the corresponding regional resource governors 1106 and 1108 are also paired. In an example embodiment, the first regional resource governor 1106 may receive the metrics from the node resource governor 1112 and aggregate the received metrics based on the nodes, the clusters, and the regions. In an example embodiment, the first regional resource governor 1106 may compute decisions and send commands with actions to the node resource governor 1112. For example, the first regional resource governor 1106 may send a command to the nodes to redirect the corresponding connections to another cluster within the region, when the CPU usage of each node is high within a cluster. Further, when the queue length of each node is long within the cluster, the first regional resource governor 1106 may send commands to the nodes to redirect the corresponding connections to another cluster within the region. The first regional resource governor 1106 may compute the decisions. Further, the first regional resource governor 1106 may redirect a new connection to a different cluster, when the cluster is overloaded. In an example embodiment, the first regional resource governor 1106 may participate in DNS resolution. Further, the first regional resource governor 1106 may start the process to create a new cluster, when the clusters in a region are overloaded. In an example embodiment, the first regional resource governor 1106 may compute the decisions and execute actions considering the paired regional resource governors. The first regional resource governor 1106 may perform actions to take the traffic going to the affected region in case of persistent unavailability or disaster in the paired region. The functionalities of the first regional resource governor 1106 are equally applicable to the functionalities of the second regional resource governor 1108, without departing from the scope of the present disclosure.

Referring back to FIG. 1, in case a subscriber 104 is available, the system 102 may immediately deliver the events to the subscriber 104. In an example embodiment, the subscriber 104 may be intermittently unavailable or intermittently failed for receiving the subscriptions 506. In such cases, the system 102 may attempt delivery of the events after a first predefined time duration. If the subscriber 104 is still unavailable at the end of the predefined time duration, the system 102 may again delay the delivery for a later time, for example, after a second predefine time duration. The system 102 may keep attempting the delivery of the event to the subscriber 104 till the subscriber 104 is available or the event expires. In an embodiment, the second predefined time duration may be greater than the first predefined time duration.

Referring back to FIG. 2, in an example embodiment, the re-director 212 may schedule the delivery of the event at later time points in case the first delivery is failed. The re-director 212 may determine the time durations for delivery of the event, based on parameters that may include, but are not limited to, a number of failures of delivery, an operational status of the subscriber 104, and a speed of the subscriber 104.

An event may have a time to live (TTL), which determines the time duration in which an event is considered active in the event notification system 102. Whenever the TTL elapses, an event is considered expired. The TTL of an event may be set at four different places: in the event notification system 102, in the topic, in the event subscription, and in the event itself. The TTL set in the event overrides the one specified in the event subscription 104, the one specified in the event subscription overrides the one specified in the topic, and the one specified in the topic overrides the one specified in the event notification system 102.

A subscriber 104 may specify the retry behavior in case the first or subsequent deliveries fail. These retry behaviors include but are not limited to the following: no retry, retry until the event reaches its time to live, retry only for a given number of failures.

A subscriber 104 may specify the event termination behavior in case the event has expired or the re-director 212 has exhausted all retries. These event termination behaviors include but are not limited to the following: drop event, move event to a dead lettered event queue.

The event notification system 102 has a dead lettered event queue that has persistent storage within storage 1402. The re-director 212 may move events to the dead lettered event queue whenever a subscriber 104 specifies the event termination behavior to be move event to a dead lettered event queue.

The re-director 212 may move events from the dead lettered event queue to a destination specified in the subscriber 104.

Table 9 shows the time durations for re-attempts determined by the re-director 212 based on the number of failures, according to an example embodiment of the present disclosure. Table 9 is shown for providing better clarity and understanding of the present disclosure, and should not be construed as limiting.

TABLE 9

| Failure Count | Delay Time |
| --- | --- |
| 1 | 10 seconds |
| 2 | 30 seconds |
| 3 | 1 minute |
| 4 | 5 minutes |
| 5 | 10 minutes |
| 6 | 30 minutes |
| 7 - Max Failure Count | 1 hours |

Further, in case the operational status of the subscriber 104 is "on probation", the re-director 212 may determine the delay duration as a time point at the end of the probation. Similarly, in case a processing rate of the subscriber 104 is 1 event per second, the re-director 212 may schedule the delivery of each subsequent event after a delay of 1 second from the previous delivery.

In an example embodiment, the re-director 212 may maintain a number of queues for delayed delivery of the events. The queues may include, but are not limited to, a 10 seconds queue, a 30 seconds queue, a 1 minute queue, a 5 minutes queue, a 10 minutes queue, a 30 minutes queue, and a 1 hour queue. The events queued up in the 10 seconds queue, the 30 seconds queue, the 1 minute queue, the 5 minutes queue, the 10 minutes queue, the 30 minutes queue, and the 1 hour queue may be delivered after a delay of 10 seconds, 30 seconds, 1 minute, 5 minutes, 10 minutes, 30 minutes, and 1 hour, respectively.

In an example embodiment, the re-director 212 may limit resources to be used for retrying to deliver the events to failed or unavailable subscribers 104. Therefore, most of the resources may be free for delivering to healthy subscribers 104. A subscription failure rate may be understood as a number of failures per second that happen when trying to deliver the events. An event delivery may be considered as failed when the system 102 does not receive an acknowledgment for the receipt of the event.

In an example embodiment, a subscription 506 may be considered "on probation", when the failure rate of the subscription 506 is greater than a failure rate threshold, and a rate of events available to deliver to the subscription 506 is greater than 1 event per second. This act of putting the subscription 506 on probation is referred to as a subscription probation. If the subscription 506 may have 1 event per second to be delivered, then the subscription 506 may not be "on probation" even when the subscription 506 may have 100% failure rate. The reason to allow 1 event per second is to continue probing the subscription 506 in case the operational status of the subscription 506 changes to "healthy". In an example embodiment, when in probation, the subscription 506 may fall in one of probation levels, namely, a level 1 with a failure rate of 5-15%, a level 2 with a failure rate of 15-30%, a level 3 with a failure rate of 30-80%, and a level 4 with a failure rate of 80-100%.

In an example embodiment, the delivery service may decrease the probation level of the subscriber 506 and may even get the subscriber out of probation after being in probation for a given probation time, if there are no more attempts to deliver to the subscriber 506. Further, the delivery service may increase the probation level or may even remove the probation of the subscriber 506 after being in probation, if the failure rate either increases or decreases to a number, which conforms to another level.

The re-director 212 may use a subscription flow control to limit the amount of resources spend on trying to deliver the events to the subscriber 506. In an example embodiment, the re-director 212 may monitor parameters, such as a deliver average success rate per subscriber 104, an average failure rate per subscriber 104, an average latency per subscriber 104, and a number of events not acknowledged by the subscriber 104. The re-director 212 may use the parameters to limit the rate of events for attempting to deliver to the subscribers 104.

In an example embodiment, the re-director 212 may schedule the events that are in excess to the rate, for delivery at a later time. The rate of delivery of the events may be determined based on the current rate and the latency. The latency may be used to increase the base rate to probe if the subscribers 104 may handle more events than the current rate. The increase to the base rate may be inversely proportional to the latency.

In an example embodiment, the re-director 212 may determine the average success rate, based on a number of successful acknowledgments per second in last N number of minutes when delivering the events to the subscriber 104. Further, the re-director 212 may determine the average failure rate based on a number of failures per second in the last N number of minutes, when delivering the events to the subscriber 104. The re-director 212 may determine the average latency based on an average time spent by the subscriber 104 for processing an event in the last N number of minutes. Further, the re-director 212 may determine a number of pending events that were delivered by not acknowledged the subscriber 104 whenever a flow control decision is being taken.

Table 10 provides a list of criteria for allowing or blocking an attempt to deliver the event at a delayed time point, according to an example embodiment of the present disclosure. Table 10 is shown for providing better clarity and understanding of the present disclosure, and should not be construed as limiting.

TABLE 10

| Latency | Condition |
| --- | --- |
| 1 second or less | Pending < rate + 1000 |
| 5 seconds or less | Pending < rate + 100 |
| 10 seconds or less | Pending < rate + 10 |
| More than 10 seconds | Pending < rate + 1 |

In an example embodiment, when the subscriber 104 surpasses a given probation and the flow control threshold, the re-director 212 may create an individual delayed queue for the subscriber 104. Further, the subsequent events of the subscriber 104 may be placed in the queue. Once the subscriber 104 becomes healthy, the re-director 212 may delete the corresponding individual queue, and may serve the events for the subscriber from the delayed queues. The re-director 212 may maintain shared delayed queues where events of all the subscribers 104 may be available.

Initially, all the events may be available in the shared delayed queues, and if the subscribers 104 stay healthy, there-director 212 may serve the events to the subscribers 104 from the shared delayed queues. In an example embodiment, when the subscriber 104 becomes unhealthy surpassing a given probation and flow control, the re-director 212 may generate the individual delayed queue for the specific subscriber 104. Subsequently, the new events that need to be scheduled for retry may be directed to the individual delayed queues directly. The events for the subscriber 104 that are in the shared delayed queues may remain in the shared queues until the re-director 212 may attempt to deliver the events. In such a case, the re-director 212 may then transfer the events to the individual queues.

Figure 12:
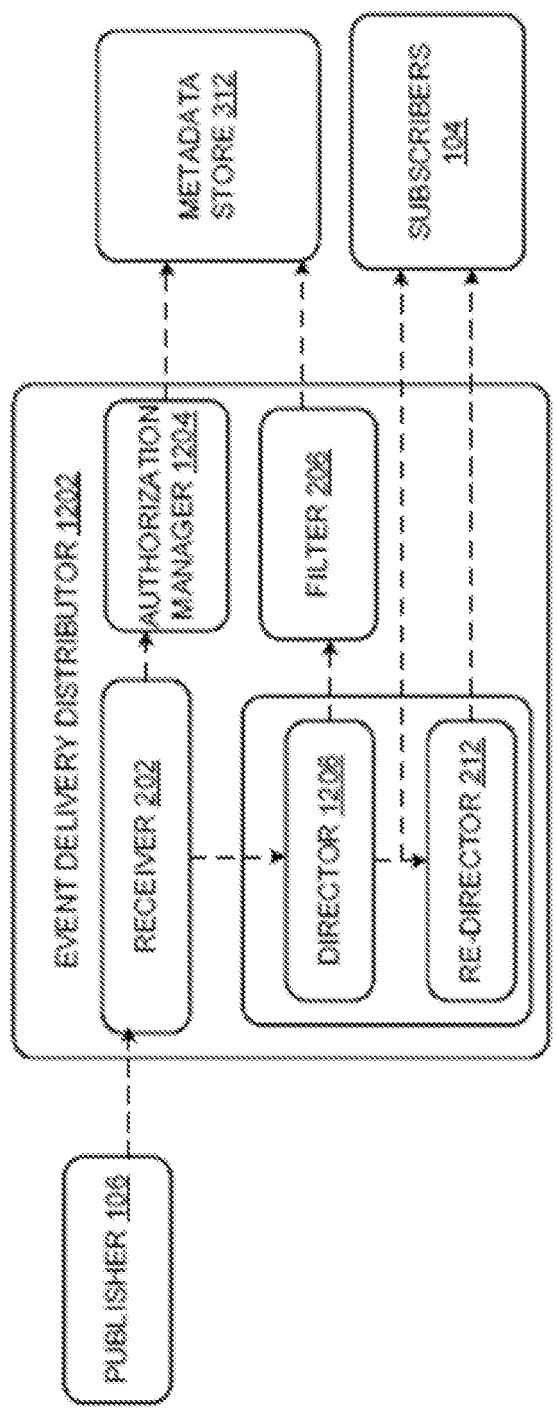
FIG. 12 illustrates a delivery of the events from the publishers to the subscribers through the system, according to an example embodiment of the present disclosure.

FIG. 12 illustrates a delivery of the events from the publishers 106 to the subscribers 104 through the system 102, according to an example embodiment of the present disclosure. For the sake of brevity, constructional and operational details of the system 102 that are already explained in the description of FIG. 1, FIG. 2, FIG. 3, FIG. 4, FIG. 5, FIG. 6, FIG. 7, FIG. 8, FIG. 9, FIG. 10, and FIG. 11 are not explained in detail in the description of FIG. 12. As shown, the system 102 may include the receiver 202, an event delivery distributor 1202, the filter 206, and an authorization manager 1204.

In an example embodiment, the receiver 202 may receive the events from the publishers 106. In an example embodiment, the receiver 202 may forward the details pertaining to the events to the authorization manager 1204. Through the authorization manager 1204, the details may be stored in the metadata store 312. Further, the events from the receiver 202 may be forwarded to the event delivery distributor 1202. The event delivery distributor 1202 may include a director 1206 and the re-director 212.

The event delivery distributor 1202 may store the details in queues. In case of successful delivery of the events to the subscriber, the publisher may receive an acknowledgement of the delivery. When such an acknowledgment is received by the publisher 106, the system 102 may ensure at least one delivery of the event. In an example embodiment, the system 102 may deliver the events almost instantly whenever the events are received from the publishers 106. In an example, it is desired for instant delivery latency to remain as close to 0. The instant delivery latency may be understood as a time span measured from the time an event is received in event grid to the point the event is delivered to the subscriber 104. This time span does not include the time that the subscriber 104 spends on processing the event.

Further, in case of an error, the publisher 106 may receive a notification indicative of the error. A set of errors may be considered as a negative acknowledgement, which would be indicative of an absence of the event in the system 102. Another set of errors may be considered as "non-deterministic" which would be indicative of uncertainty of presence of the event in the system 102.

The director 204 of the event delivery distributor 1202 may provide an instant delivery of the events to the subscribers 104. The events from the receiver 202 may be read by the director 204 in big batches starting from the front of the queue. The batches of events may be matched with the subscriptions 506 which may generate output events. The output events may be grouped and attempted to be delivered to the subscribers 104 as specified in the subscriptions 506. In an example embodiment, when the event is not delivered by the director 1206, the director 204 may direct the event into another queue for further attempts of delivery. Once the event is delivered or placed into another queue for retry, the director 204 may delete the event from the queue of the first attempt. In an example embodiment, the director 1206 may receive a delivery status of each event from the subscribers 104. The delivery status may include, but is not limited to, "successful" and "failure" in receiving the notifications for the events.

In an example embodiment, the notifications of the output events are placed into another queue for delayed delivery if the event is not expired. The targeted event notifications may be delivered at later time points when placed into the delayed queues. In an example embodiment, the re-director 212 may receive one or move events from the director 1206 based on the delivery status. The redirector 212 may read the output events in big batches starting from the front of the queue. The event notifications may then be grouped by the subscriptions 506 and may be delivered to the subscribers 104 accordingly. In case an event notification is not delivered, the event notification may be placed into another queue to be delivered later. In an example embodiment, the event delivery distributor 1202 may forward the metadata of the events to the metadata store 312.

Figure 13:
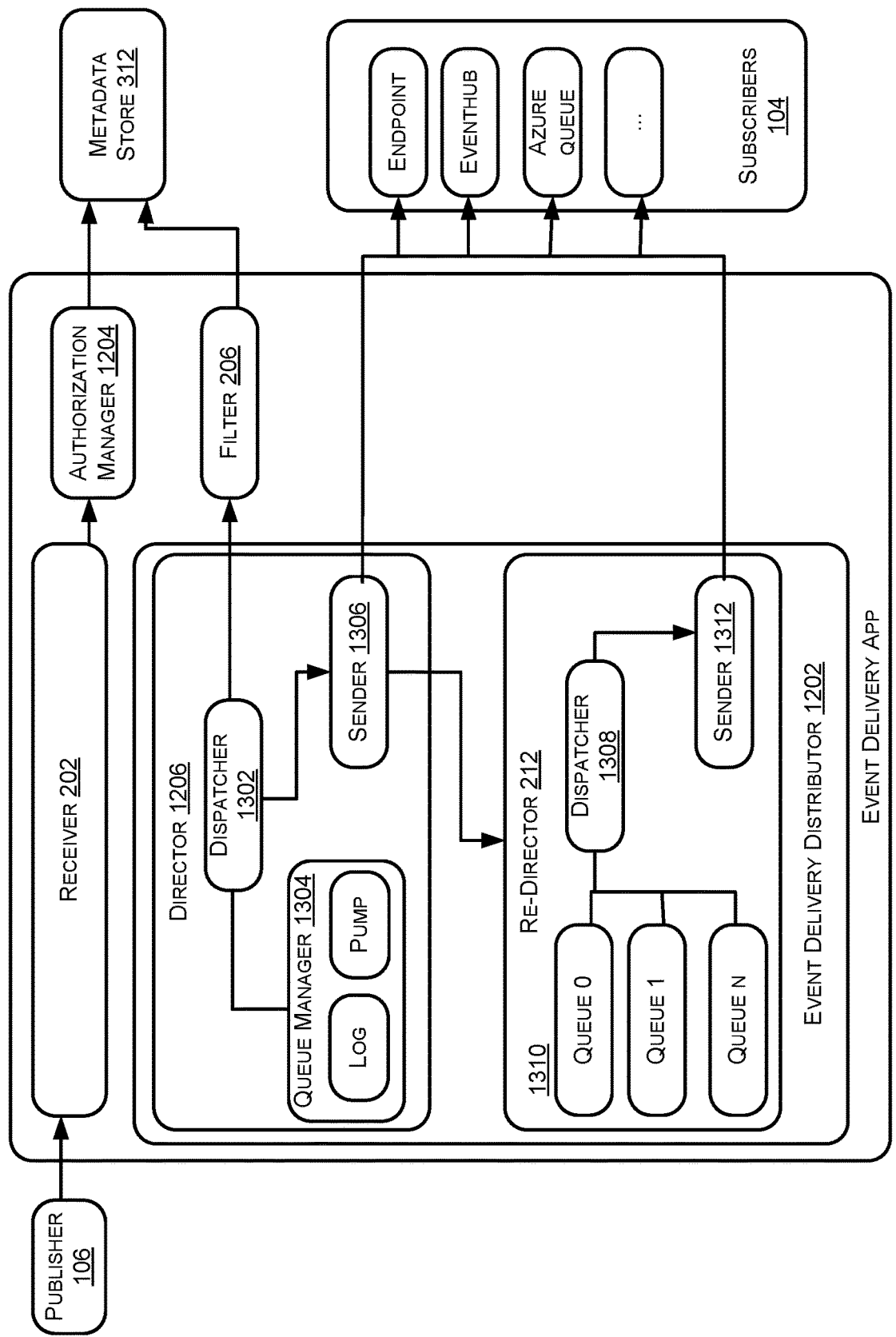
FIG. 13 illustrates queues to be formed by a director and a re-director of an event delivery distributor of the system, according to an example embodiment of the present disclosure.

FIG. 13 illustrates queues to be formed by the director 1206 and the re-director 212 of the event delivery distributor 1202, according to an example embodiment of the present disclosure. For the sake of brevity, constructional and operational details of the system 102 that are already explained in the description of FIG. 1, FIG. 2, FIG. 3, FIG. 4, FIG. 5, FIG. 6, FIG. 7, FIG. 8, FIG. 9, FIG. 10, FIG. 11, and FIG. 12 are not explained in detail in the description of FIG. 13. As shown, the director 1206 may include a dispatcher 1302, a queue manager 1304, and a sender 1306. Further, the re-director 212 may include a dispatcher 1308, a queue manager 1310, and a sender 1312.

In an example embodiment, the receiver 202 may forward a batch of events to the event delivery distributor 1202. The receiver 202 may receive an acknowledgement of storage of the batch of the events. The instant delivery distributor 1202 may store the batch and return with an acknowledgement as "not error".

The director 1206 may acquire credits to determine that there are enough resources to continue with the first attempt of delivery of the event to the subscriber 104. Further, the director 1206 may forward batches from the local queue. Further, the filter 206 may filter batches of the events. The director 1206 may select the sender 1306 based on factors, such as endpoint type and an event subscription 506. In case of the event subscriptions 506 with low latency requirements, the sender 1306 may attempt a delivery of the event by posting the batch of events to the destination endpoint through WebHook, or by putting the batch of the events in the queues, or by forwarding the batches of the events through Event hub, or putting the batch of events in a storage queue. Further, in case of failure, the director 1206 may compute delay time for the events and may forward the events based on the delay time.

In case of in-probation event subscriptions 506, the director 1206 may compute the delay time for the events and may forward the events based on the delay time. In case of the event subscription 506 with high latency requirements, the director 1206 may set the delay time to zero and forward the events based on the delay time.

In an example embodiment, even in the presence of the failures, the events may be placed into the delayed queues, also known as retry queues. Such queues may handle retries as well as regular first attempt deliveries for the subscriptions 506 in probation and with high latency requirements. The re-director 212 may maintain a number of delay queues. Each queue may have a pump running reading events. Each pump may acquire credits to be able to continue pumping. When a delayed queue has the events to process, the events may be forwarded to the dispatcher 1308. The batcher 1308 may batch the events based on the subscriptions 506 and forward to the sender 1312. The sender 1312 may be selected based on the endpoint type and the event subscription 506.

The sender 1312 may attempt the delivery of the events by posting the batch of events to the subscribers 104 through Webhook, or by putting the events into the queues, or by sending the batch of events through Eventhub, or by putting the events into the storage queue. In case of failure, the events may be forwarded to the dispatcher 1308 to determine the suitable queue based on the delay time. In case of in-probation event subscriptions 506, the events may be forwarded to the dispatcher 1308 for determining the suitable queue based on the delay time.

In case of failure, the re-director 212 may perform an exponential back-off approach to determine the delay time based on a number of failures of delivery, an operational status of the subscriber 104, and the speed of the subscriber 104. In an example embodiment, the delivery time may be the probation ending time, considering the probation status of the event subscription 506.

In an example embodiment, the redirector 212 may have a pump per delayed queue. The pump may read the batch of events, may select the first batch of events that are ready for delivery, and may then forward the selected events to the dispatcher 1308 for delivery.

Figure 14:
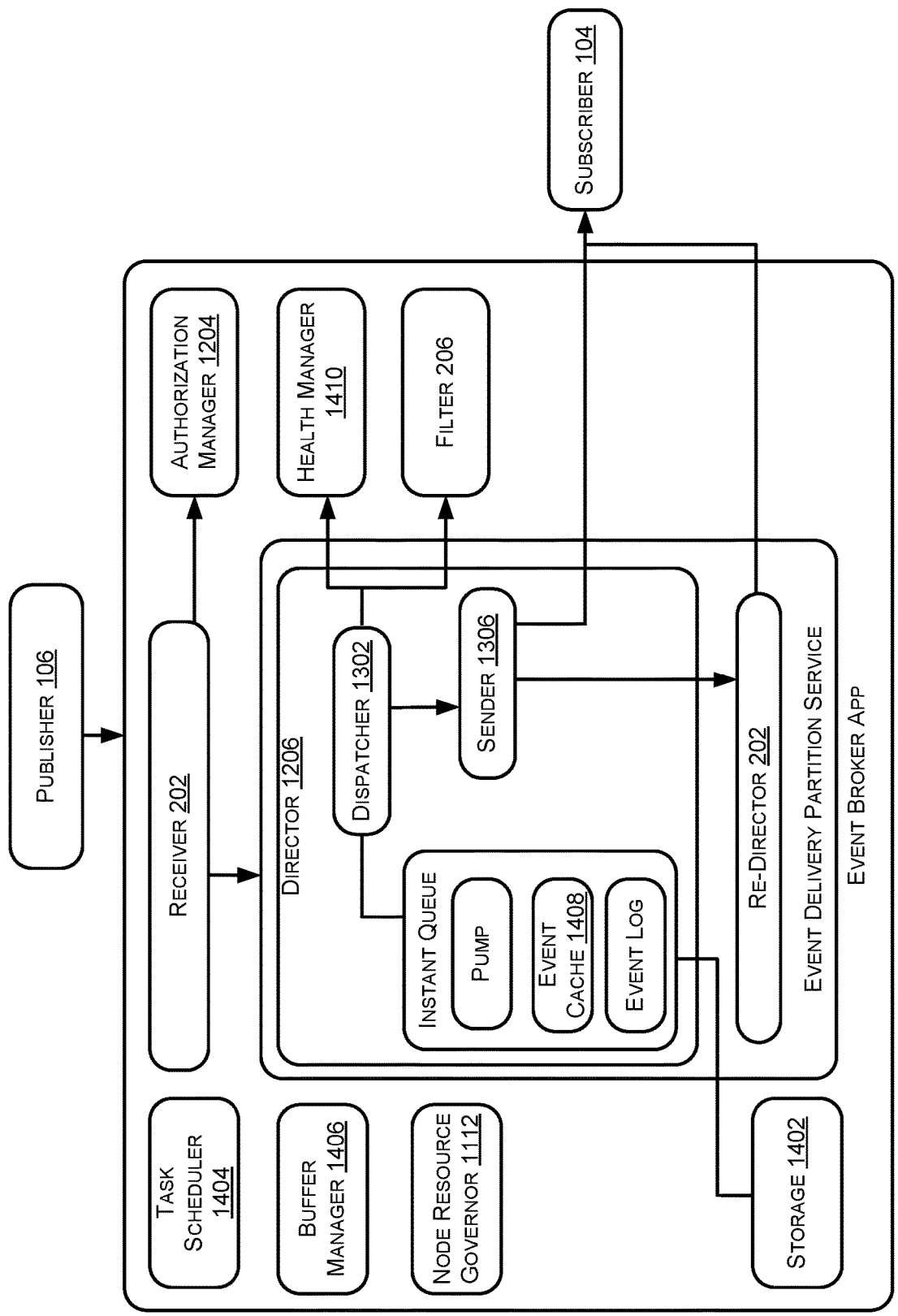
FIG. 14 illustrates delivery of events by the director 1206 of the system 102, according to an example embodiment of the present disclosure.

FIG. 14 illustrates delivery of events by the director 1206 of the system 102, according to an example embodiment of the present disclosure. For the sake of brevity, constructional and operational details of the system 102 that are already explained in the description of FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13 are not explained in detail in the description of FIG. 14. As shown, the system 102 may include storage 1402, a task scheduler 1404, and a buffer manager 1406. Further, the queue manager 1304 may include queue cache 1408.

In an example embodiment, the receiver 202 may receive a batch of events from the publisher 106. Thereafter, the receiver 202 may select one of local instant event delivery services and forwards the batch of events to the director 1206. Once the event batch is reliably stored, the receiver 202 may receive an acknowledgement from the director 1206. Further, on receiving the event batch, the director 1206 may append the event batch to the queue manager 1304. On successfully appending the event batch, the director 1206 may send an acknowledgement to the receiver 202.

Subsequently, the sender 1306, depending on its type, may try to make first attempt delivery for event subscriptions with very low latency requirements. For instance, HTTP Service delivers a batch of events to a destination endpoint. The queue manager 1304 may enqueue batch of events. On failure of delivery of events, the director 1206 may forward the events to the redirector 212.

In an example, an event delivery to a subscriber 104 is considered to be an instant event delivery when the subscriber 104 acknowledges the delivery in first attempt. In other words, if the subscriber 104 fails to receive the event or replies with a negative acknowledgment, the event delivery is not considered to be instant event delivery. Further, if the subscriber 104 fails to receive the event or replies with a negative acknowledgment, the event delivery is considered to be a delayed event delivery.

According to an example embodiment, to achieve low latency, the director 1206 may perform the following strategies:

a) De-Serialize Only System Properties

The director 1206 may de-serialize only the system properties and skip de-serializing the payload part. An example of event is provided below. In the example provided below, "id", "topic", and "data" are considered as system properties. Further, data is considered as payload and skipped. As a result, significant amount of time is saved as the "data" that is skipped may be significantly big. For instance, the size of the data may vary from bytes to Megabytes.

```
{
    "id": "beb0db9e-1346-4470-9c5a-afe841557d58",
    "topic": "stockPrice"
    "subject": "MSFT",
    "data": {
        "symbol": "MSFT",
        "stockPrice": "73",
        "Time": "2017-07-28T10:37"
    }
}
``` b) Caching Received Events to Avoid Reading from Storage

For instant event delivery, the received events are immediately entitled to be delivered to the subscribers 104. This creates an opportunity to store the received events in a memory cache. The director 1206 may first write the events to the storage 1402. If the write is successful, then the director 1206 may add the events to the queue cache 1408. Subsequently, the director 1206 may reply to the publisher 106 with an acknowledgment. In case the queue cache 1408 is full, the director 1206 may skip the step of adding the just received events to the queue cache 1408. Accordingly, whenever the queue cache 1408 has available space, the events may be read from the storage 1402 and placed into the queue cache 1408. As soon as all the events from storage 1402 are placed into the queue cache 1408, the director 1206 may continue adding just received events to the queue cache 1408. In an example, size of the queue cache 1408 is in Gigabytes. As a result, this allows enough events to be ready in memory without having to wait for reads from the storage 1402.

c) Prioritization of Instant Event Delivery Related Tasks

In an example embodiment, the task scheduler 1404 of the system 102 may allow execution of tasks with different priorities. In an example, the instant event delivery related tasks may be given highest priorities. The task scheduler 1404 may be internally organized with three priority queues. Further, the task scheduler 1404 may get a free work item instance from the work item instance pool; fill out the work type and work data, and enqueue in a work queue as defined by the work type. The following list defines the types of work and the queues to which these belong.

1. Priority 0 Work Queue:
   a. Work Types:
      i. Append to Instant Queue
      ii. Checkpoint in Instant Queue
      iii. Append to Delayed Queue when the caller is the Instant Delivery Service
2. Priority 1 Work Queue:
   a. Work Types:
      i. Read from Instant Queue
      ii. Filter events.
      iii. Calls to Metadata Store.
      iv. Push events from the Instant Delivery Service.
3. Priority 2 Work Queue:
   a. Read from Delayed Queue
   b. Checkpoint in Delayed Queue
   c. Append to Delayed Queue when the caller is the Delayed Delivery Service
   d. Push events from the Delayed Delivery Service.

According to an embodiment, the task scheduler 1404 may allow execution of a configurable concurrent number of tasks. The task scheduler 1404 may give 50% of these slots to the Priority 0 queue, 30% to the Priority 1 queue, and 20% to the Priority 3 queue. If there no enough tasks of a higher priority, the task scheduler 1404 may allow more tasks from lower priority work queues. In an example, an event broker is a process running a virtual machine that receives events, matches these events to event subscriptions, and delivers the matching events to the destination endpoints defined in the matching event subscriptions. Further, an event broker node is a virtual machine running an event broker process.

d) Processing of an Event in the Same Thread from when it Received to when it is Delivered In an example embodiment, the task scheduler 1404 may use the same thread to process a given event. In an example, the thread is assigned when the event is received or read from the storage 1402. After this point, filtering, delivery, and all other operation for an event may be performed in the same thread. As a result, time spent on thread context switching may be eliminated.

e) Using the Same Memory Buffer for an Event from when it is Received to when it is Delivered As soon as the event is received or read from the storage 1402, the event is placed in a memory buffer. For the rest operations that are performed for this event, a reference to the memory buffer is passed. As a result, amount of time taken to copy the event from buffer to buffer is significantly reduced.

f) Avoid Re-Serializing Events when Delivering to Subscribers

Any additional system property is delivered in a different structure without adding to the event structure. This allows avowing having to re-serialize the event.

g) Event Broker Node Auto Scale

In an example embodiment, when the node resource governor 1112 detects that the event broker node is approaching its event processing capacity, the node resource governor 1112 may report it to the cluster and regional resource governors may either increase the number of nodes of a cluster or create a new cluster altogether.

h) Unhealthy Subscribers

Health manager 1410 may track the health of the subscribers. If a subscriber 104 is unhealthy, the events for that subscriber 104 may be forwarded to the redirector 212. This saves the time that it would have taken to process these events. In an example embodiment, these above strategies a) to h) in conjunction allow to decrease the instant event delivery latency to less than 500 milliseconds.

In an example embodiment, when an event subscription to any topic is created, publishing of events on that topic is enabled on behalf of the user through an input, for example, a one-gesture input, and the event flow happens end-to-end. This is accomplished in one-gesture. In an example, the one-gesture input may be drawing a pattern on a touch-sensitive screen of a computing device, clicking on a hyperlink, or selecting an option from a drop-down menu to add/delete/modify a subscription. Further, it may be noted that the subscriptions can also be managed based on more than one-gesture inputs received from a subscriber without deviating from the scope of the present subject matter. In an example, an event describes something that takes place in the system 102. Every event is associated with a set of common information such as the source of the event, time when the event took place, and a unique identifier. Further, every event is associated with specific information relevant only to that specific event. For example, an event about a new file being created in storage may contain details about the file, its metadata like lastTimeModified, etc. In another example, an event about a VM rebooting may contain the VM in question, the reason for reboot, etc. An example of a captureFileCreated event that originates in the event hub service is provided below.

```
{
"topic":"/subscriptions/E5389C13-6477-4D96-8020-F2D591F304E7/resourc
egroups/resourceGroup1/providers/Microsoft.EventHub/namespaces/names
pace1",
    "subject": "eventhubs/eventHub1",
    "eventType": "captureFileCreated",
```

```
"eventTime": "2017-07-26T18:34:54.9957684Z",
"id": "b886947b-082b-4ab5-8179-d7c11eb909f8",
    "data": {
    "fileUrl":
    "https://gridtest1.blob.core.windows.net/acontainer/eventgridtest1/eh1/1/20
    17/07/26/18/33/54.avro",
        "fileType": "BlockBlob",
        "partitionId": "1",
        "sizeInBytes": 0,
        "eventCount": 0,
        "firstSequenceNumber": -1,
        "lastSequenceNumber": -1,
        "firstEnqueueTime": "0001-01-01T00:00:00",
        "lastEnqueueTime": "0001-01-01T00:00:00"
    }
}
```

Further, in an example embodiment, an event source is typically a system where events take place. Examples of event sources include, but are not limited to, storage service, event hubs service, VM fabric etc. Event sources are responsible of publishing events that happen to the event grid. In an example, the events may be categorized into topics, so that subscribers 104 can decide appropriately which topics to subscribe depending on the type of events the subscribers 104 are interested in. The topics also provide an event schema so that subscribers 104 can discover how to consume the events appropriately. An example of a topic is provided below:

```
/subscriptions/E5389C13-6477-4D96-8020-F2D591F304E7/resourcegrou
ps/resourceGroup1/providers/Microsoft.EventHub/namespaces/namespa
ce1
```

An event subscription instructs the event grid on which events on a topic a subscriber is interested in receiving. A subscription may be understood as an artifact that holds configuration on how events should be delivered to the subscriber. An example of an event subscription created based on the above example topic is provided below:

```
{
"id":
"/subscriptions/E5389C13-6477-4D96-8020-F2D591F304E7/resourceGro
ups/resourceGroup1/providers/Microsoft.EventHub/namespaces/namesp
ace1/providers/Microsoft.EventGrid/eventSubscriptions/eventSubscription
1",
    "name": "eventSubscription1",
    "type": "Microsoft.EventGrid/eventSubscriptions",
    "properties": {
    "destination": {
    "endpointType": "WebHook",
    "properties": {
    "endpointUrl": https://<webhook URL>
    }
        },
        "filter": {
        "subjectBeginsWith": "/eventhubs/eh1",
        "subjectEndsWith": "",
        "includedEventTypes": ["All"]
        }
    }
}
```

From event grid perspective, a subscriber 104 is the final place where the events are delivered where further action gets taken to successfully process the events. In an example, the event grid supports multiple subscriber types and depending on the subscriber, event grid may follow different mechanisms to guarantee the delivery of the event. An example of a subscriber is a code that runs at the web hook URL provided in the above example.

In an example embodiment, the event grid supports a one-gesture creation of event subscription. The customer needs to only take the action of creating the event subscription without worrying about how to configure the event source, and without having to do any other manual action every time an event subscription gets created, updated, or deleted. The event grid is responsible for configuring the corresponding event source to enable publishing of events to the specified topic. The event grid supports the following three mechanisms for configuring the publishing of events by event sources:

1) Direct Communication with the Event Source

When an event subscription is created, updated, or deleted, event grid may directly invoke a pre-registered endpoint of the event source to either enable or disable notifications. Each event source may be responsible for implementing this contract specified by the event grid. The contract may support following functionalities:

a. Enable an Event Source to Publish Events for a Topic for a Set of Subscription Filters Whenever an event subscription is created or updated in event grid, the event source needs to be enabled to publish events matching the specified subscription filter on the topic of interest. To achieve this, whenever an event subscription is created or updated in the event grid, the contract implemented by the event source may be invoked by the event grid, with details about the new or updated event subscription. Examples of this may be an action (creation of an event subscription), an event source (event hubs service), topic ("/subscriptions/E5389C13-6477-4D96-8020-F2D591F304E7/resourcegroups/resourceGroup1/providers/Microsoft.EventHub/namespaces/namespace1"), and subscription filter, such as SubjectBeginsWith: "eventhubs/eventHub1", SubjectEndsWith: " ", and Included Event Types: "captureFileCreated".

Figure 15:
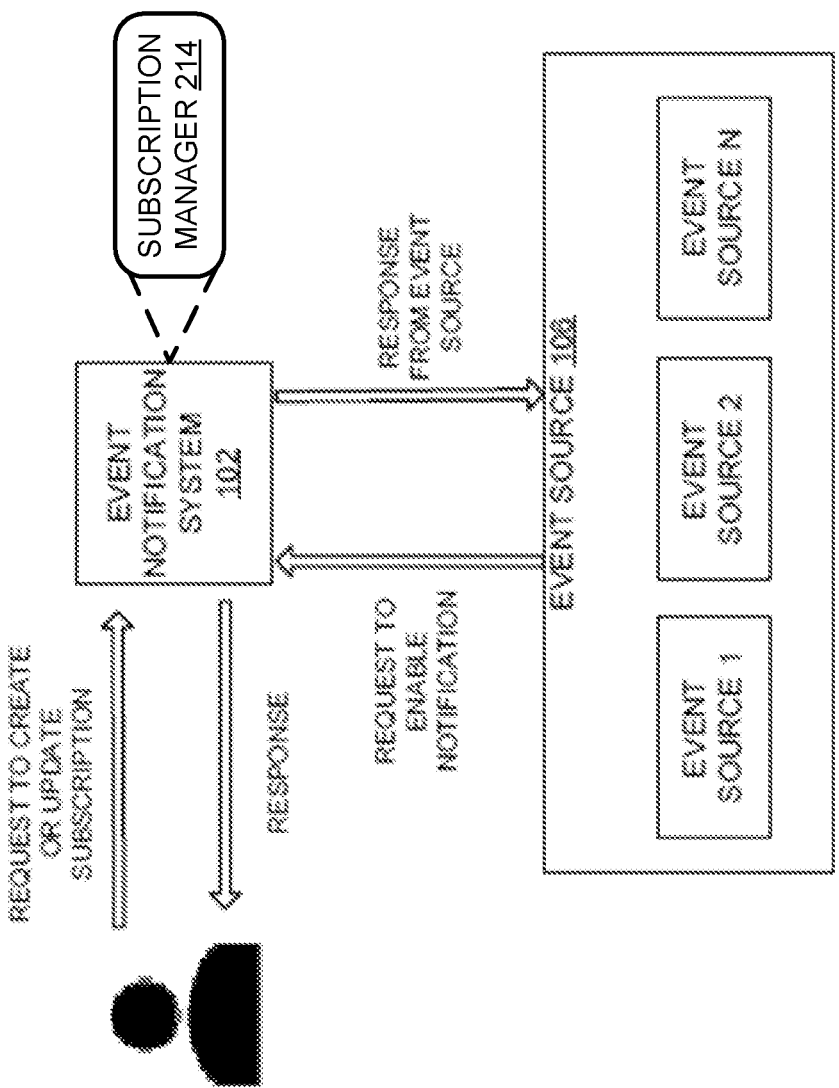
FIG. 15 illustrates creation of event subscription, according to an example embodiment of the present disclosure.

FIG. 15 illustrates creation of event subscription, according to an example embodiment of the present disclosure. For the sake of brevity, constructional and operational details of the system 102 that are already explained in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 are not explained in detail in the description of FIG. 15.

As shown in FIG. 15, the system 102 comprises the subscription manager 214 to manage the subscription corresponding to the subscribers 104. In an example embodiment, the event source 106, for example, event hubs service, may receive the information described above when an event subscription gets created. Once the event source 106 receives the information, the event source 106 may update its configuration so that the event source 106 may start publishing events to the system 102 whenever the captureFileCreated event happens under the given topic and subject filters.

In an example, consider the event subscription below. When the event subscription is created for the first time, the corresponding event source 106 may need to be enabled to start publishing events corresponding to the topic: "/subscriptions/E5389C13-6477-4D96-8020-F2D591F304E7/resourceGroups/resourceGroup1/providers/Microsoft.EventHub/namespaces/namespace1" for subjects starting with "eventhubs/eh1" and for event type "captureFileCreated". As a result, the event source 106 may listen for notifications about event subscriptions being created, and once the event source 106 receives the information (provided below) about the new event subscription that got created, the event source 106 may track the information in its service to publish events to the system 102 whenever these conditions are met.

```
{
"id":
"/subscriptions/E5389C13-6477-4D96-8020-F2D591F304E7/resourceGro
ups/resourceGroup1/providers/Microsoft.EventHub/namespaces/namesp
ace1/providers/Microsoft.EventGrid/eventSubscriptions/eventSubscription
1",
    "name": "eventSubscription1",
    "type": "Microsoft.EventGrid/eventSubscriptions",
    "properties": {
    "destination": {
    "endpointType": "WebHook",
    "properties": {
    "endpointUrl": https://<webhook URL>
   }
     },
      "filter": {
      "subjectBeginsWith": "/eventhubs/eh1",
      "subjectEndsWith": "",
      "includedEventTypes": ["All"]
      }
    }
}
``` b. Disable Notifications from an Event Source for a Topic for a Set of Subscription Filters:

According to an example embodiment, whenever an event subscription is deleted in the system 102 and if it is the last such event subscription matching that topic and specified subscription filters, then the event source 106 needs to be configured to not publish events matching the specified subscription filter on the topic of interest. To achieve this, whenever an event subscription is deleted in the system 102, the contract implemented by the event source 106 may be invoked by the subscription manager 214, with details about the deleted event subscription. For example,
  i. Action: Delete of an event subscription
  ii. Event Source 106: Event Hubs Service
  iii. Topic: "/subscriptions/E5389C13-6477-4D96-8020-F2D591F304E7/resourcegroups/resourceGroup1/providers/Microsoft.EventHub/namespaces/namespace1"
  iv. Subscription Filter:
    I. SubjectBeginsWith: "eventhubs/eventHub1"
    II. SubjectEndsWith: " "
    III. Included Event Types: "captureFileCreated"

Figure 16:
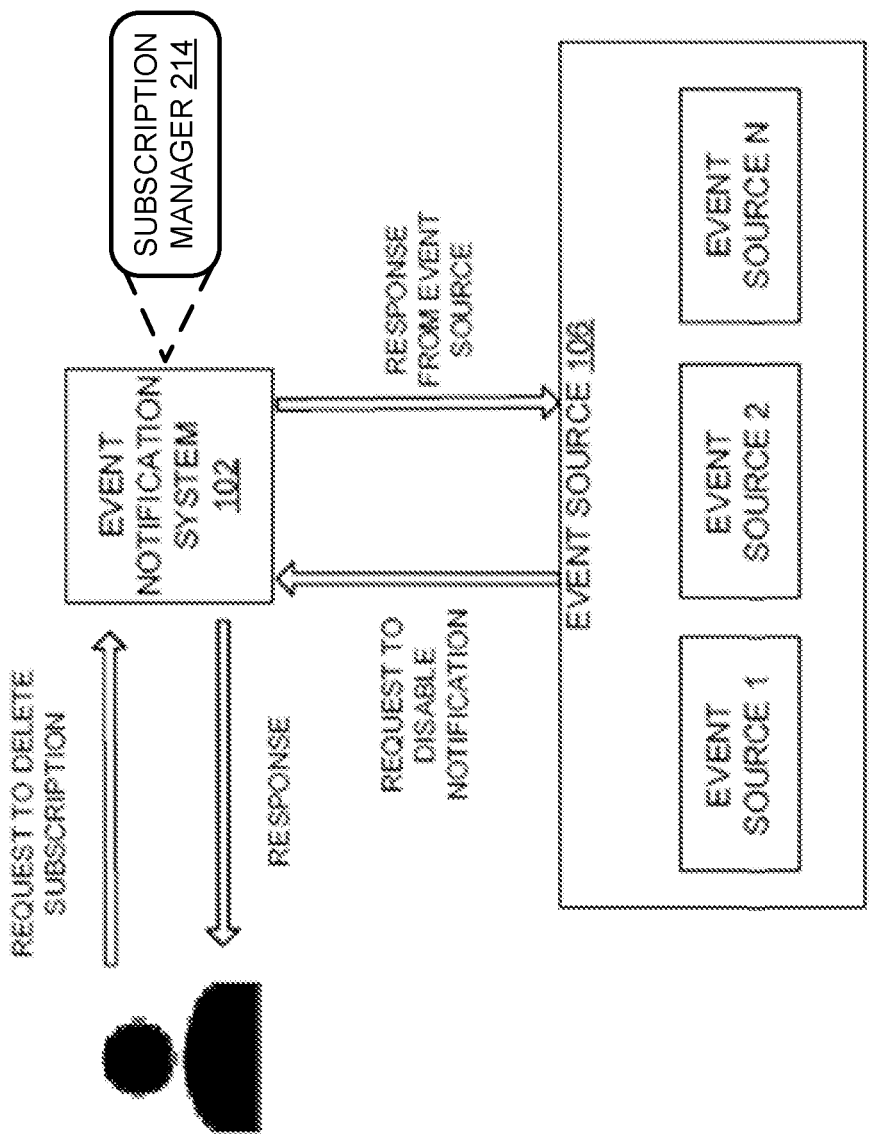
FIG. 16 illustrates deletion of event subscription, according to an example embodiment of the present disclosure.

FIG. 16 illustrates deletion of event subscription, according to an example embodiment of the present disclosure. For the sake of brevity, constructional and operational details of the system 102 that are already explained in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 are not explained in detail in the description of FIG. 16.

In an example embodiment, the event source 106, for example, event hubs service, may receive the information described above when an event subscription gets deleted. Once the event source 106 receives the information, the event source 106 may verify that the event subscription is the last remaining event subscription to this topic. On determining that the event subscription is the last remaining event subscription, the event source 106 may update its configuration to stop publishing events to the system 102 for the specified topic.

2) Pull Mechanism

In an example embodiment, each event source 106 may be responsible for periodically querying the system 102 to retrieve information about the event subscriptions created for one or more topics belonging to that event source 106. This may be achieved by getting all event subscriptions under a scope. The subscription manager 214 supports retrieval of all event subscriptions created under a scope. For example, an event source 106 may query the system 102 to get all event subscriptions, from the subscription manager 214, that exist for that event source 106. By periodically querying and obtaining this information, an event source 106 may determine the set of event subscriptions that have been created for topics belonging to that event source 106. Based on this, the event source 106 can enable or disabling publishing of events corresponding to those. Using the pull mechanism, an event source 106 may be able to call the system 102 to get all event subscriptions corresponding to the event source 106. An example of a response to this call is provided below.

```
"values": [
  {
   "id":
"/subscriptions/E5389C13-6477-4D96-8020-F2D591F304E7/resourceGro
ups/resourceGroup1/providers/Microsoft.EventHub/namespaces/namesp
ace1/providers/Microsoft.EventGrid/eventSubscriptions/eventSubscription
1",
    "name": "eventSubscription1",
    "type": "Microsoft.EventGrid/eventSubscriptions",
    "properties": {
      "destination": {
        "endpointType": "WebHook",
        "properties": {
          "endpointUrl": "https://<webhook-endpoint-1>"
        }
      },
      "filter": {
        "subjectBeginsWith": "eventhubs/eh1",
        "subjectEndsWith": "",
        "includedEventTypes": ["captureFileCreated"]
      }
    }
  },
  {
   "id":
"/subscriptions/E5389C13-6477-4D96-8020-F2D591F304E7/resourceGro
ups/resourceGroup2/providers/Microsoft.EventHub/namespaces/namesp
ace2/providers/Microsoft.EventGrid/eventSubscriptions/eventSubscription
2",
    "name": "eventSubscription2",
    "type": "Microsoft.EventGrid/eventSubscriptions",
    "properties": {
      "destination": {
```

```
        "endpointType": "WebHook",
        "properties": {
            "endpointUrl": "https://<webhook-endpoint-2>"
        }
      },
      "filter": {
        "subjectBeginsWith": "eventhubs/eh2",
        "subjectEndsWith": "",
        "includedEventTypes": ["captureFileCreated"]
      }
    }
  }
]
```

Using the current active event subscriptions from the above response, the event source 106 may publish events for the topics in these subscriptions, and disable publishing of events for the event subscriptions that are no longer active.

3) Communicate with the Event Sources Through a Broker

According to an example embodiment, to enable or disable notifications, the subscription manager 214 may not invoke the event source 106 directly. Instead, the system 102 and the event sources 106 may communicate using a broker component. The broker component can be event grid itself, or it can be an existing service such as resource manager. Using this broker, event sources 106 can register to be notified whenever any of the following happens:

a) An Event Grid Event Subscription is Created or Updated

According to an example embodiment, the event sources 106 may register to be notified by the broker whenever an event subscription is created or updated. In an example, when a customer creates or updates an event subscription in the subscription manager 214, the broker may notify each of the registered event sources 106. An example of the data provided as part of this notification would be:

i. Action: Create of an event subscription
   ii. Event Source: Event Hubs Service
   iii. Topic: "/subscriptions/E5389C13-6477-4D96-8020-F2D591F304E7/resourcegroups/resourceGroup1/providers/Microsoft.EventHub/namespaces/namespace1"
   iv. Subscription Filter:
      I. SubjectBeginsWith: "eventhubs/eventHub1"
      II. SubjectEndsWith: " "
      III. Included Event Types: "captureFileCreated"

In an example embodiment, once the event source 106 receives a notification, the event source 106 may update its configuration so that it can start publishing events to the system 102 whenever the captureFileCreated event happens under the given topic and subject filters.

As an example, consider the event subscription below. When this event subscription is created for the first time, the corresponding event source 106 may be enabled to start publishing events corresponding to the topic-"/subscriptions/E5389C13-6477-4D96-8020-F2D591F304E7/resourceGroups/resourceGroup1/providers/Microsoft.EventHub/namespaces/namespace1" for subjects starting with "eventhubs/eh1" and for event type "captureFileCreated". Hence, the event source 106 may listen for notifications about event subscriptions being created, and once it receives the below information about the new event subscription that got created, it will track this information in its service to publish events to the system 102 whenever these conditions are met.

```
{
  "id":
"/subscriptions/E5389C13-6477-4D96-8020-F2D591F304E7/resourceGroups/resourceGroup1/providers/Microsoft.EventHub/namespaces/namespace1/providers/Microsoft.EventGrid/eventSubscriptions/eventSubscription1",
  "name": "eventSubscription1",
  "type": "Microsoft.EventGrid/eventSubscriptions",
  "properties": {
    "destination": {
      "endpointType": "WebHook",
      "properties": {
        "endpointUrl": "https://<webhook URL>"
      }
    },
    "filter": {
      "subjectBeginsWith": "/eventhubs/eh1",
      "subjectEndsWith": "",
      "includedEventTypes": ["captureFileCreated"]
    }
  }
}
```

4) Disable Notifications from an Event Source for a Topic for a Set of Subscription Filters According to an example embodiment, whenever an event subscription is deleted in the system 102 and if it is the last such event subscription matching that topic and specified subscription filters, the event source 106 may be configured to not publish events matching the specified subscription filter on the topic of interest. To achieve this, the contract implemented. An example of this would be:

i. Action: Delete of an event subscription
   ii. Event Source: Event Hubs Service
   iii. Topic: "/subscriptions/E5389C13-6477-4D96-8020-F2D591F304E7/resourcegroups/resourceGroup1/providers/Microsoft.EventHub/namespaces/namespace1"
   iv. Subscription Filter:
      I. SubjectBeginsWith: "eventhubs/eventHub1"
      II. SubjectEndsWith: " "
      III. Included Event Types: "captureFileCreated"

According to an example embodiment, the event source 106 may receive the above information whenever an event subscription gets deleted. Once the event source 106 receives the information, the event source 106 may verify that it is the last remaining event subscription to this topic, and accordingly it will update its configuration to stop publishing events to the system 102 for the specified topic.

Therefore, according to the present subject matter, the customer may need to use only gesture to create the event subscription without any manual configuration of the event source. Further, any number of event subscriptions (up to a maximum support limit) to the same topic can be created, updated, or deleted, without having to maintain a reference count or configuring the event source across a variety of subscription filters. Furthermore, the customer may not have to understand the configuration approach for each event source. Each event source may have a different mechanism of how to enable notifications; however this becomes transparent to the customer, and the customer just focuses on creating the event subscription as a one-stop operation. Also, the access control is an integrated operation and happens synchronously at the time of creating the event subscription. Only users who have access to create or delete event subscriptions for a resource will be able to perform those operations.

In an example embodiment, applications may use the system 102 for streaming the events as generated by the applications and become the publishers 106. The system 102 may create one or more topics to publish the events to, may create subscriptions to react to the events, may publish the events to the corresponding topics, and may then process the events as appropriate.

In another example embodiment, applications may subscribe to the system 102 and become the subscribers 104 of the system 102. The system 102 may provide the topics to the events by default. The system 102 may create the subscriptions 104 to route the events to the subscribers 104 as well as to communication the publishers 106 that the events have to be published.

Figure 17:
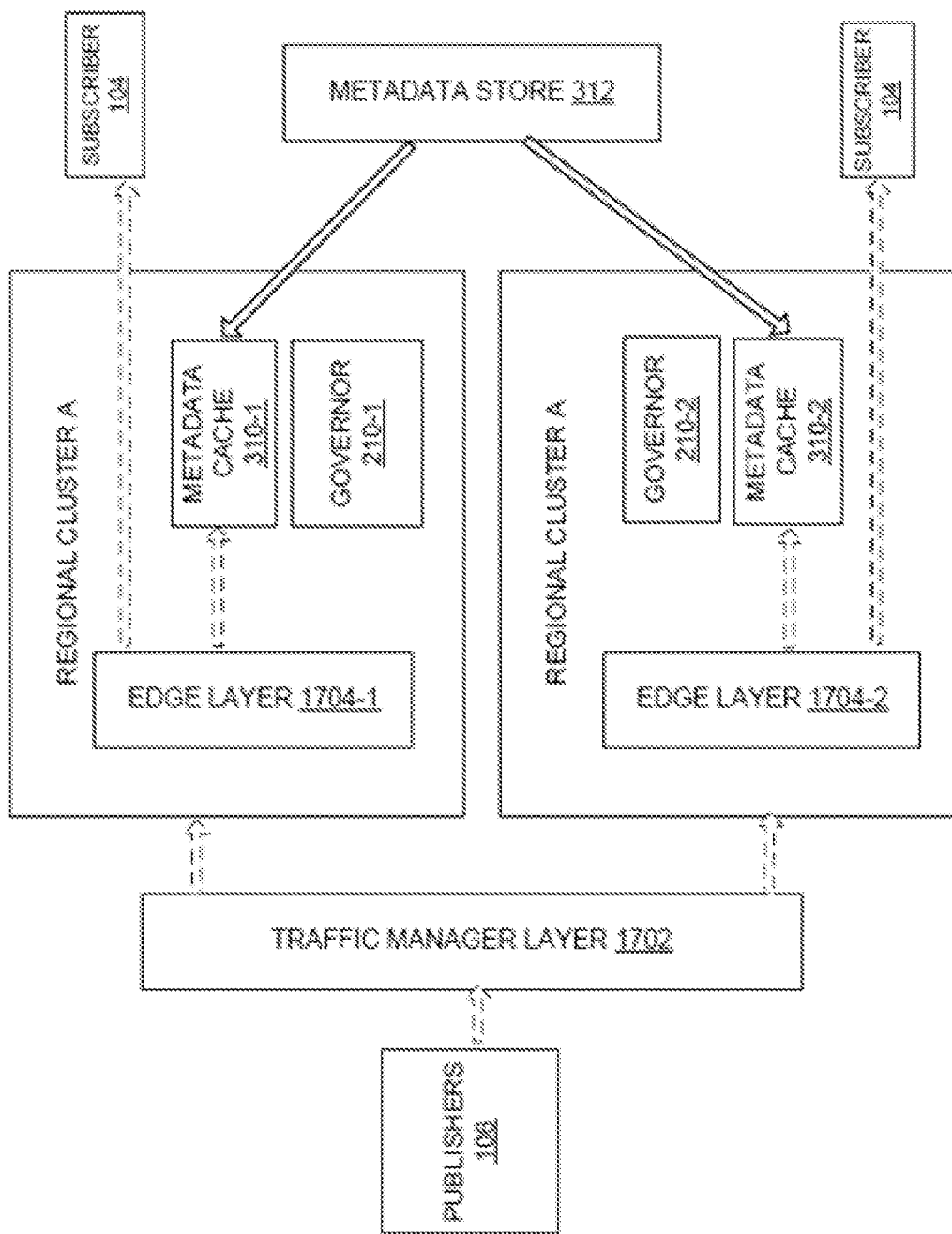
FIG. 17 illustrates a block diagram of the system, according to another example embodiment of the present disclosure.

FIG. 17 illustrates a block diagram of the system 102, according to another example embodiment of the present disclosure. For the sake of brevity, constructional and operational details of the system 102 that are already explained in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16 are not explained in detail in the description of FIG. 17.

The system 102 may receive the events from the event sources or the publishers 106 through a traffic manager layer 1702. The events may be distributed between a regional cluster A and a regional cluster B. Each of the regional cluster A and the regional cluster B may include an edge layer 1704-1 and an edge layer 1704-2, respectively. Further, the regional cluster A may include the metadata cache 310-1 and the governor 210-1. Similarly, the regional cluster B may include the metadata cache 310-2 and the governor 210-2. The metadata cache 310-1 and the metadata cache 310-2 may be in communication with the metadata store 312. Further, the edge layer 1704-1 and the edge layer 1704-2 may be in communication with the subscribers 104.

The traffic manager layer 1702 may add or remove new clusters, add or remove nodes from rotation in existing clusters, balance traffic among the clusters, and route the traffic. Further, the traffic manager layer 1702 may create an ATM profile for each grid region. Further, the profile load may balance DNS requests with DNS for the event grid clusters in the region. The ATM may perform a periodic probe to each of the clusters and may remove the cluster from the rotation, if the probe fails. Each cluster in the profile may be assigned with a weight and the traffic may then be distributed among the clusters based on the weight. Further, the weight of each cluster may dynamically be adjusted by the governor 210.

In an example embodiment, the metadata store 312 may store details pertaining to the topics, the event schemas, authorization information for the publishers 106, and the subscriptions 506 and their configuration. Further, the metadata cache 310-1 and the metadata cache 310-2 may store details related to the edge layer 1704-1 and the edge layer 1704-2, respectively. The metadata cache 310-1 and the metadata cache 310-2 may be indexed or organized appropriately so that event routing is as fast as possible even in case of millions of subscriptions 506.

Further, the edge layers 1404 may receive the events from the event sources 106, route the events, and deliver the events to the subscribers 104. The edge layer 1404 may store the event and replicate the event to multiple machines to prevent data losses. The event may then be routed based on the subscriptions 506. The subscriber 104 may acknowledge receipt of the event.

Figure 18:
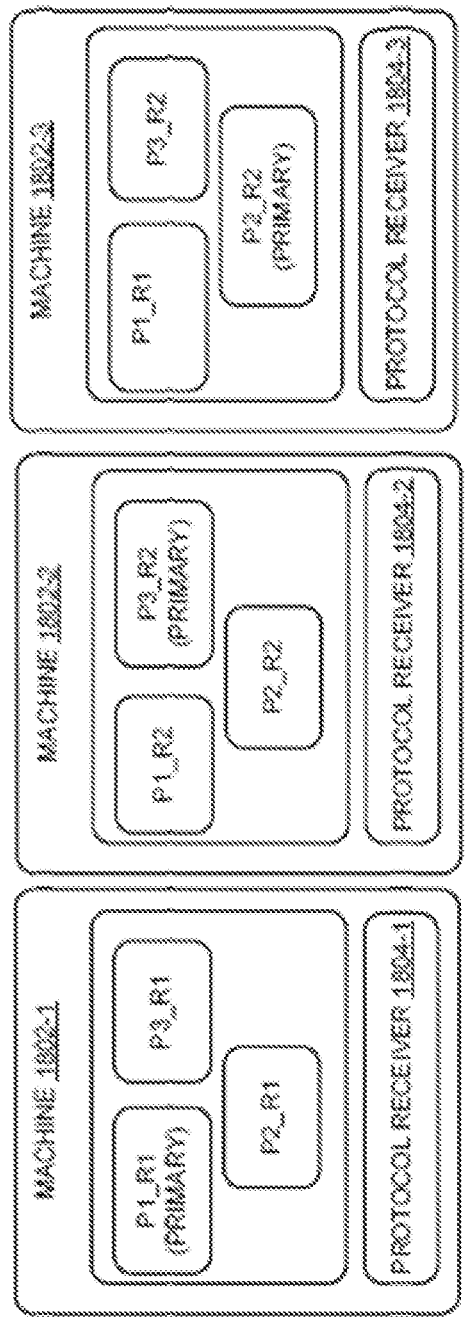
FIG. 18 illustrates a partition of an edge layer in regional clusters, according to another example embodiment of the present disclosure.

FIG. 18 illustrates a partition of the edge layer 1404 in the regional clusters, according to another example embodiment of the present disclosure. For the sake of brevity, constructional and operational details of the system 102 that are already explained in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17 are not explained in detail in the description of FIG. 18.

As shown, each edge machine on the cluster may be hosting one or more partition replicas, namely a machine 1802-1, a machine 1802-2, and a machine 1802-3. The machine 1802-1, the machine 1802-2, and the machine 1802-3 may collectively be referred to as the machine 1802. Each machine 1802 may include one primary replica and two or more secondary replicas. Further each machine 1802 may include a protocol receiver 1804 to receive the events from the network. When the protocol receiver 1804 may dispatch the events to one of the primary replicas. The events may be dispatched such that the event distribution among the primary replicas is balanced.

When an event is dispatched to the primary replica, the primary replica may store the event to a persistent storage and replicate the event to the secondary replicas. The primary replica may acknowledge the event till a majority of replicas have permanently store the event on the persistent storage. If the event is not saved by the majority of replicas, a protocol request may be completed with an error code.

Once the events are on the persistent storage, the events may be routed and delivered to the subscribers 104 by the primary replica. The events may be removed from a permanent storage until successfully delivery to the subscribers 104. If the primary replica fails or is shutdown, a second replica may be promoted to be primary replica. The new primary replica may continue routing and delivering the events received by the old primary replica. If a replica is down for more than a predefined time, then a new replica may be formed from the primary to minimize data loss in the system 102.

Further, for routing, each machine may contain an in-memory cache of the routing records present in a cluster metadata store. For each persisted event, the system 102 may determine whether the in-memory cache contains the information to route the event. In an example embodiment, when the in-memory cache may not contain the information, the routing records may be needed to route the event from the cluster metadata store. Further, the routing records may be received in the in-memory cache.

The system 102 may determine the subscribers 104 interested in the event using the in-memory cache. In an example embodiment, the in-memory routing cache may purge the records using multiple policies. For example, the system 102 may purge the records after the cache exceeds predefined size. Further, the system 102 may purge the records that have exceeded a certain age on the in-memory cache. In another example, the system 102 may purge the record when the cluster metadata store may notify the edge machine that the record has changed.

With the multiple share-nothing clusters and the traffic manager layer 1702, the system 102 may provide a high availability for local failures in a region. The system 102 may provide a transparent fail over in case of data loss in the region. The system 102 may pair regions, for example, US South Central (USSC) is paired to US North Central (USNC). By pairing the regions, the scope for the metadata store may effectively be not regional, but Geo-Paired. Therefore, all the subscriptions 506 for USSC and USNC may be in one metadata store service.

The clusters in the "geo-pair" may synchronize subscriptions 506 from the combined metadata store. For example, the clusters in USSC and USNC may locally cache the subscriptions 506 defined in the metadata store USS- C_USNC. The traffic manager layer 1702 may be configured such that the event sources 106 communicate with the event grid clusters that are in the same region as the event sources 106. In case of a regional failure, the traffic manager layer 1702 may reconfigure to redirect traffic to the available region in the geo-pair. An example of the configuration by the traffic manager layer is shown in Table 11. Table 11 is shown for providing better clarity and understanding of the present disclosure, and should not be construed as limiting.

TABLE 11

| | | |
|---|---|---|
| gridcluster-ussc1.cloudapp.net | US South Central | Healthy |
| gridcluster-ussc2.cloudapp.net | US South Central | Healthy |
| gridcluster-usnc1.cloudapp.net | US North Central | Healthy |
| gridcluster-usnc2.cloudapp.net | US North Central | Healthy |
| Policy: Health, Proximity | | |

When the traffic manager layer 1702 is configured as shown in table 11, the event sources 104 in South Central, for example, may publish to any healthy cluster in the South Central. If the clusters in the South Central are unavailable, then the event sources 104 may automatically get redirected to publish to the clusters in North Central.

Therefore, the system 102 may provide high availability, since it can tolerate failures of a particular node or of a complete cluster or of a full region. Further, with the combination of the cluster resource governors and the regional resource governors as well as the ability to horizontally scale out the number of nodes in the cluster as well as the number of clusters in a region, the system 102 may quickly add more capacity which allows having low latency.

Figure 19:
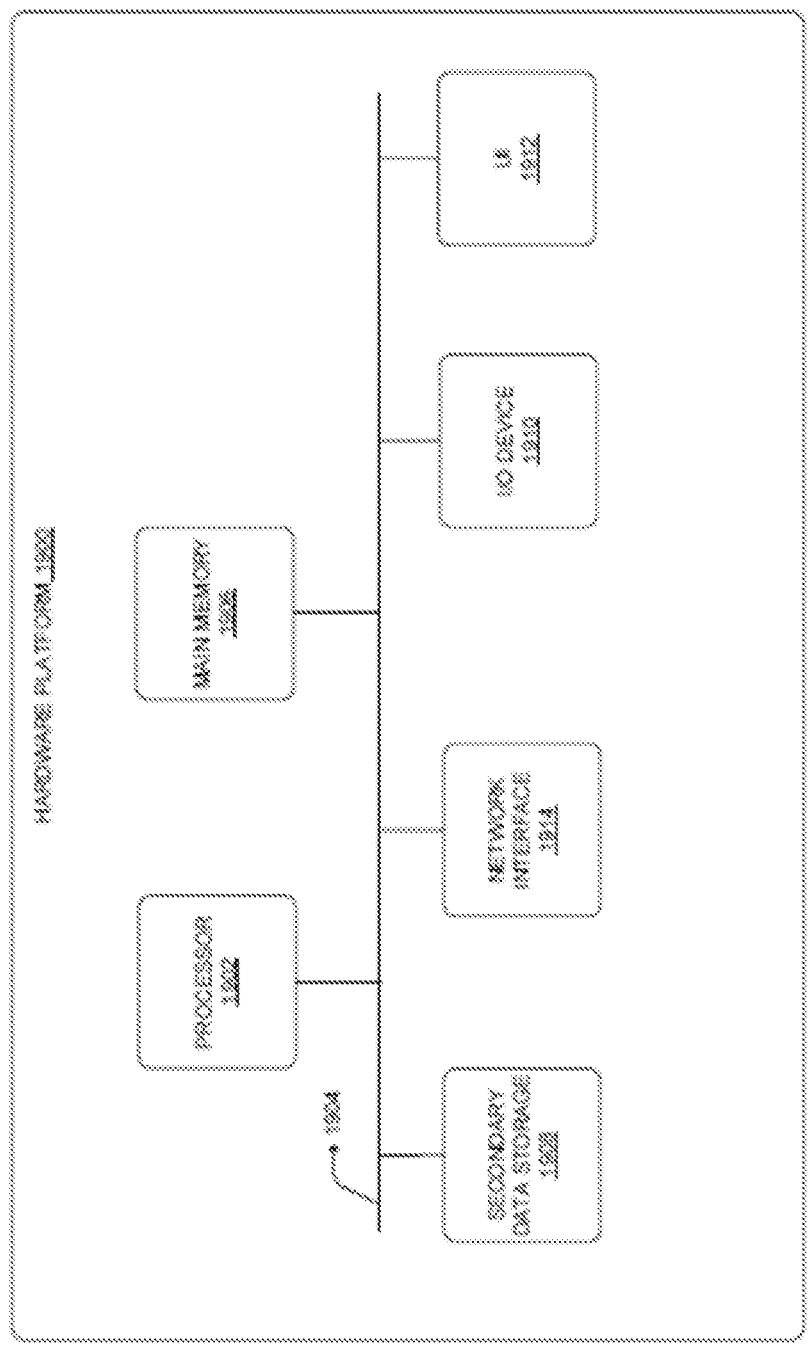
FIG. 19 illustrates a hardware platform for implementation of the system, according to an example embodiment of the present disclosure.

FIG. 19 illustrates a hardware platform 1900 for implementation of the system 102, according to an example of the present disclosure. In an example embodiment, the hardware platform 1900 may be a computing device for implementing the system 102 that may be used with the examples described herein. The computing device may represent a computational platform that includes components that may be in a server or another computing device. In an example embodiment, the computing device may include, but is not limited to, a laptop, a desktop, and a smartphone. The computing device may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computing device may include a processor 1902 that may implement or execute machine readable instructions for performing some or all of the methods, functions, techniques and/or other processes described herein. Commands and data from the processor 1902 may be communicated over a communication bus 1904. The computing device may also include a main memory 1906, such as a random access memory (RAM), where the machine readable instructions and data for the processor 1902 may reside during runtime, and a secondary data storage 1908, which may be a non-volatile memory and may store machine readable instructions and data. The main memory 1906 and the data storage 1908 are examples of non-transitory computer readable mediums. The main memory 1606 and/or the secondary data storage 1908 may store data used by the system 102, such as an object repository including web objects, configuration data, test data, etc.

The computing device may include an Input/Output (I/O) device 1910, such as a keyboard, a mouse, a display, etc. The input/output device 1910 may include a user interface (UI) 1912 for interacting with a user of the system 102. The UI 1912 may operate with I/O device 1910 to accept from and provide data to a user. The computing device may include a network interface 1914 for connecting to a network. Other known electronic components may be added or substituted in the computing device. The processor 1902 may be designated as a hardware processor. The processor 1902 may execute various components of the system 102 described above and perform the methods described below.

Referring to FIG. 20-25, the methods illustrate dispatching of targeted event notifications to subscribers 104, in accordance with an example embodiment of the present disclosure. The processor may execute the methods described herein. Also, the methods may be described in the general context of machine readable instructions. For example, the processor 1902 as shown in FIG. 19 may execute the machine readable instructions to execute the methods. The methods may also be practiced in a distributed computing environment where functions are performed by remote processing devices that are linked through a communication network. In a distributed computing environment, computer executable instructions may be located in both local and remote computer storage media, including memory storage devices.

The order in which the methods are described is not intended to be construed as a limitation, and any number of the described method blocks can be combined in any order to implement the methods or alternative methods. Additionally, individual blocks may be deleted from the methods without departing from the spirit and scope of the subject matter described herein. Furthermore, the methods can be implemented in any suitable hardware, software, firmware, or combination thereof.

Figure 20:
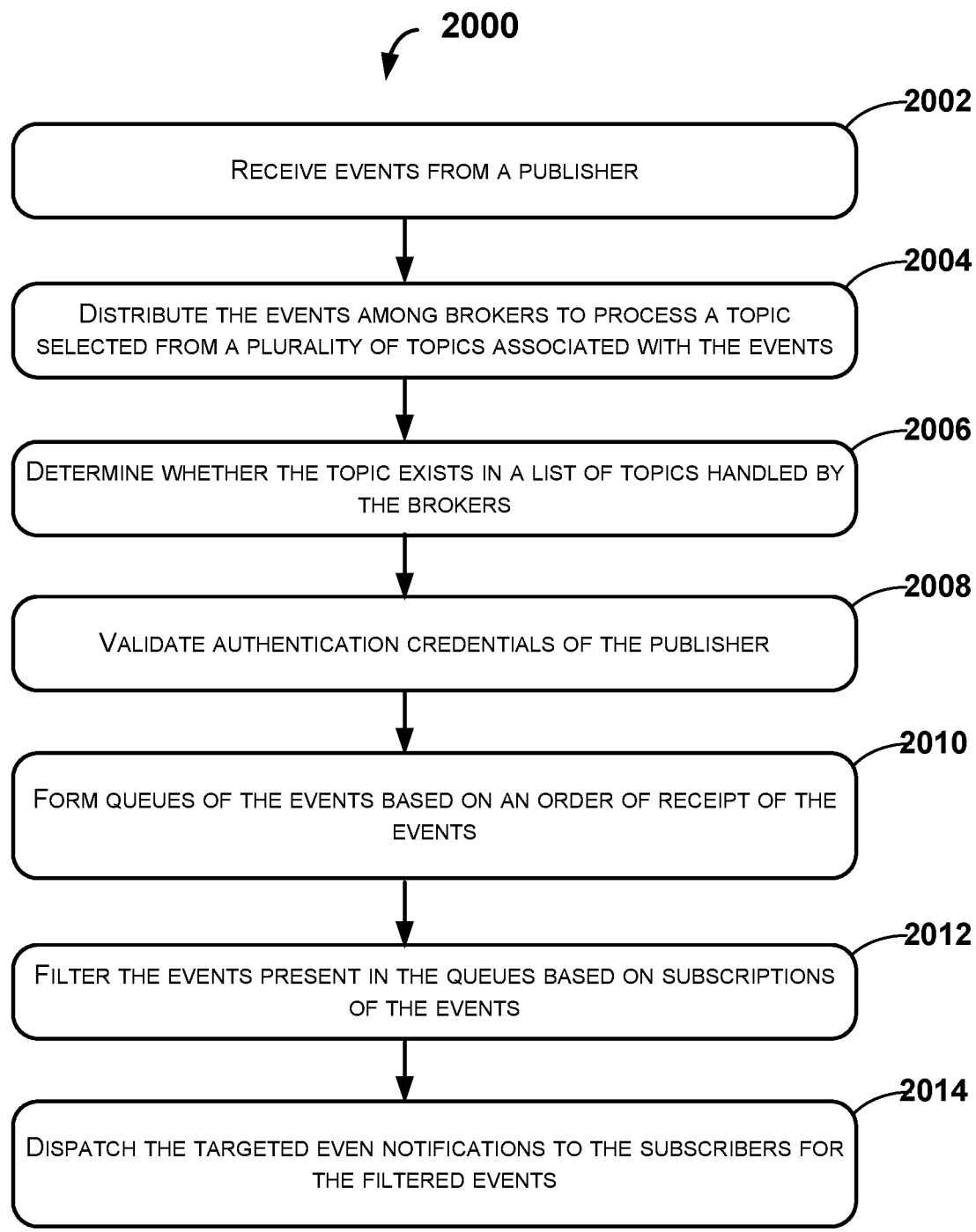
FIG. 20 illustrates an exemplary method for dispatching targeted event notifications to subscribers by scaling the system, according to an example embodiment of the present disclosure.

FIG. 20 illustrates an exemplary method for dispatching targeted event notifications to subscribers 104 by scaling the system, according to an example embodiment of the present disclosure.

At block 2002, events are received from a publisher 106. The events may be understood as an occurrence of certain operations for which a subscriber 104 may want to receive a notification. Examples of the events may include may include information, such as a source of the event, a time stamp indicating a time of occurrence of the event, and a unique identifier. The events may be assigned with a plurality of topics. In an example, a topic may provide an event schema for consumption of the events by the subscribers 104. The events may be published to the topics, which may then be notified to the subscribers 104 of the topics At block 2004, the events are distributed among brokers 302 to process a topic selected from the plurality of topics based on the events. The brokers 302 are responsible for processing the topics. Since number of the events occurring in a network of service may be quite high, the events may be distributed among the multiple brokers 302 to reduce the latency in sending the notifications.

At block 2006, it is determined whether the topic exists in a list of topics handled by the brokers 302. In an example, each of the brokers 302 may comprise metadata cache 310. The metadata cache 310 is periodically updated with topics and subscriber metadata received from a metadata store 312. The subscriber metadata may comprise data related to subscription and subscriber information. In this way, the broker may process an event for which the topics weren't available in the metadata cache 310 initially. Further, the brokers 302 may download all the subscriptions for the topic when number of subscriptions per topic is limited.

At block 2008, authentication credentials of the publisher 106 are validated based on the determination. In an example, the event received from the publisher 106 comprises the authentication credential. These authentication credentials are matched with credentials present in subscriptions requested by a subscriber 104 for various topics. Once the authentication credentials are validated, it is determined the subscriber 104 is interested in getting a notification from the publisher 106 about the event.

At block 2010, queues of the events are formed based on an order of receipt of the events. Once the validation is completed, the queues of the events are formed.

At block 2012 the events present in the queues are filtered based on subscriptions of the events. In an example, if the subscriber 104 has not requested a subscription for the event which is present in the queue, the notification is not sent to the subscriber 104 and the event is discarded. In this manner, filtering of the events is performed and a targeted event notification is sent to the subscriber 104 based on his subscriptions.

In an example, to scale the system, if a single topic is getting traffic over multiple connections, then the traffic may be distributed to the other brokers 302 present in the system. Further, in another example, the distributor 204 may request the traffic manager to add or remove a cluster 402 upon based on the traffic load of the plurality of events. The clusters 402 may comprise a metadata replica 402 of the metadata store 312 so that the cluster 402 can process the events for which the metadata was not present in the metadata cache 310.

At block 2014, the targeted even notifications are dispatched to the subscribers 104 for the filtered events.

Figure 21:
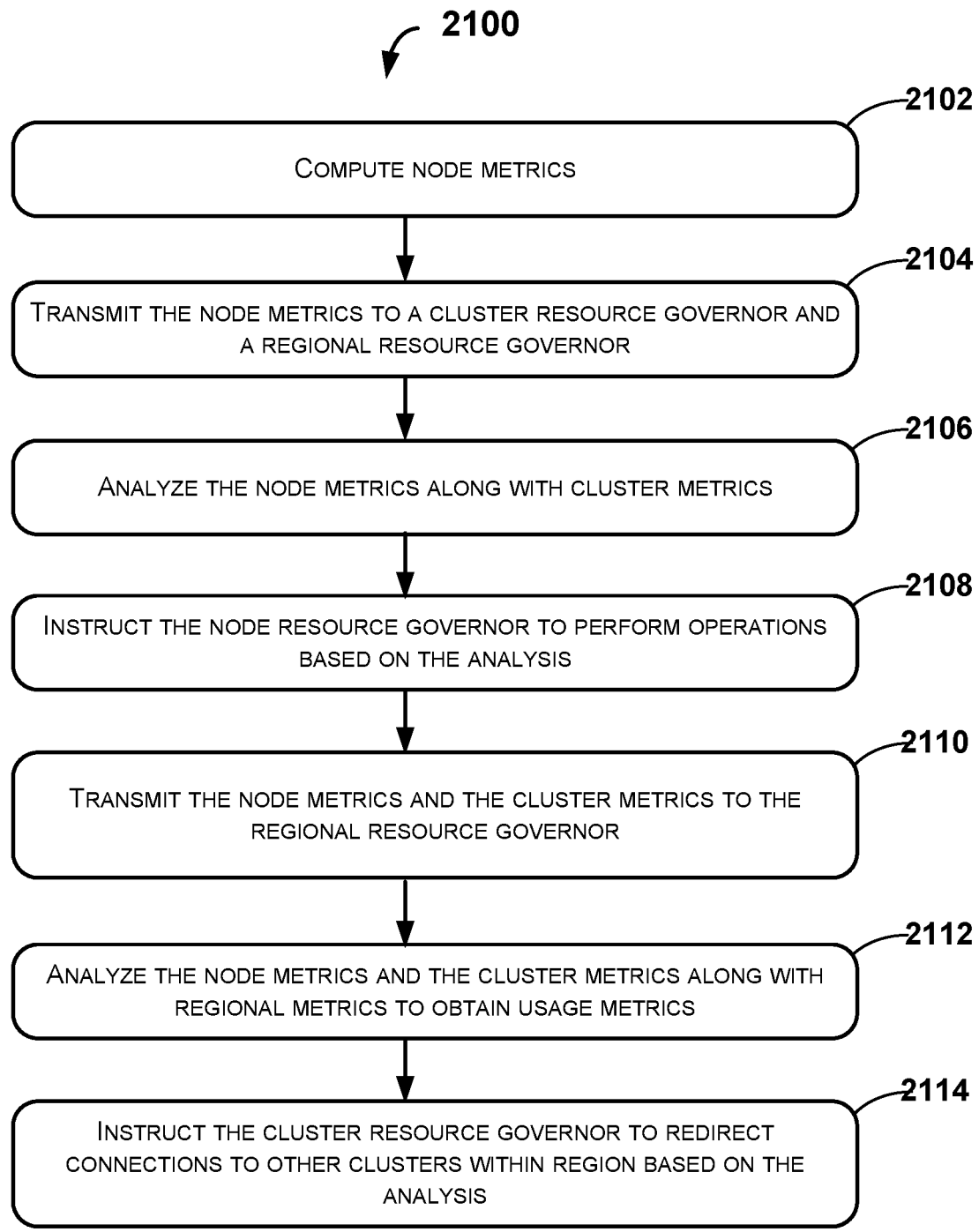
FIG. 21 illustrates an exemplary method for governing resources present in the system, according to an example embodiment of the present disclosure.

FIG. 21 illustrates an exemplary method for governing resources present in the system, according to an example embodiment of the present disclosure.

At block 2102, node metrics is computed. In an example, the node resource governor 1112 may retrieve various parameters associated with a particular node and compute the node metrics. In an example, the node metrics may include at least one of a CPU usage, a memory usage, a disk utilization, a publish event receive rate, a publish latency, an end-to-end latency, a queue length, number of primary partitions in the node, a subscriber 104 event delivery rate, and number of incoming and outgoing connections.

At block 2104, the node metrics to the cluster resource governor 1110 and the regional resource governor 1106 for further computation. In an example, to manage the resource in the system as per the load, the node resource governor 1112 transmits the node metrics and waits for instructions from the cluster resource governor 1110 and the regional resource governor 1106.

At block 2106, the node metrics is analyzed along with cluster metrics. In an example, the cluster resource governor 1110 compute the cluster metrics based on various parameters associated with the clusters. Subsequently, the cluster resource governor 1110 analyzes the node metrics and the cluster metrics to instruct the node resource governor 1112.

At block 2108, the node resource governor 1112 is instructed to perform operations. In an example, based on the analysis of the node metrics and the cluster metrics, the cluster resource governor 1110 may instruct the node resource governor 1112 to perform the operations including, but not limited to, close connections, cap the publish event receive rate, cap the subscriber 104 event delivery rate, or remove node from load balancer.

At block 2110, the node metrics and the cluster metrics are transmitted to the regional resource governor 1106. In an example, the cluster resource governor 1110 sends the cluster metrics to the regional resource governor 1106. Further, the cluster resource governor 1110 may determine whether all the nodes are overloaded or not. If the cluster resource governor 1110 identifies that all the nodes are overloaded, then the cluster resource governor 1110 may increase number of Virtual Machines (VMs).

At block 2112, the node metrics and the cluster metrics are analyzed along with regional metrics to obtain the usage metrics. In an example, the usage metrics may include parameters associated with the event grid. The usage metrics may include a CPU usage, a memory usage, a disk utilization, a publish event receive rate, a publish latency, an end-to-end latency, a queue length, number of primary partitions in the node, a subscriber 104 event delivery rate, and number of incoming and outgoing connections.

At block 2114, the cluster resource governor 1110 is instructed to redirect connections to other clusters within region, when one of redirection criteria is met. The redirection criteria comprising determining if CPU usage of every node is high in a cluster and determining if the queue length of every node is longer than a predefined length. Further in an example, the regional resource governor 1106 may instruct the cluster resource governor 1110 to redirect new connections to other clusters if a cluster is overloaded. In another example, the regional resource governor 1106 may instruct the cluster resource governor 1110 to create a new cluster if all clusters in a region are overloaded.

Figure 22:
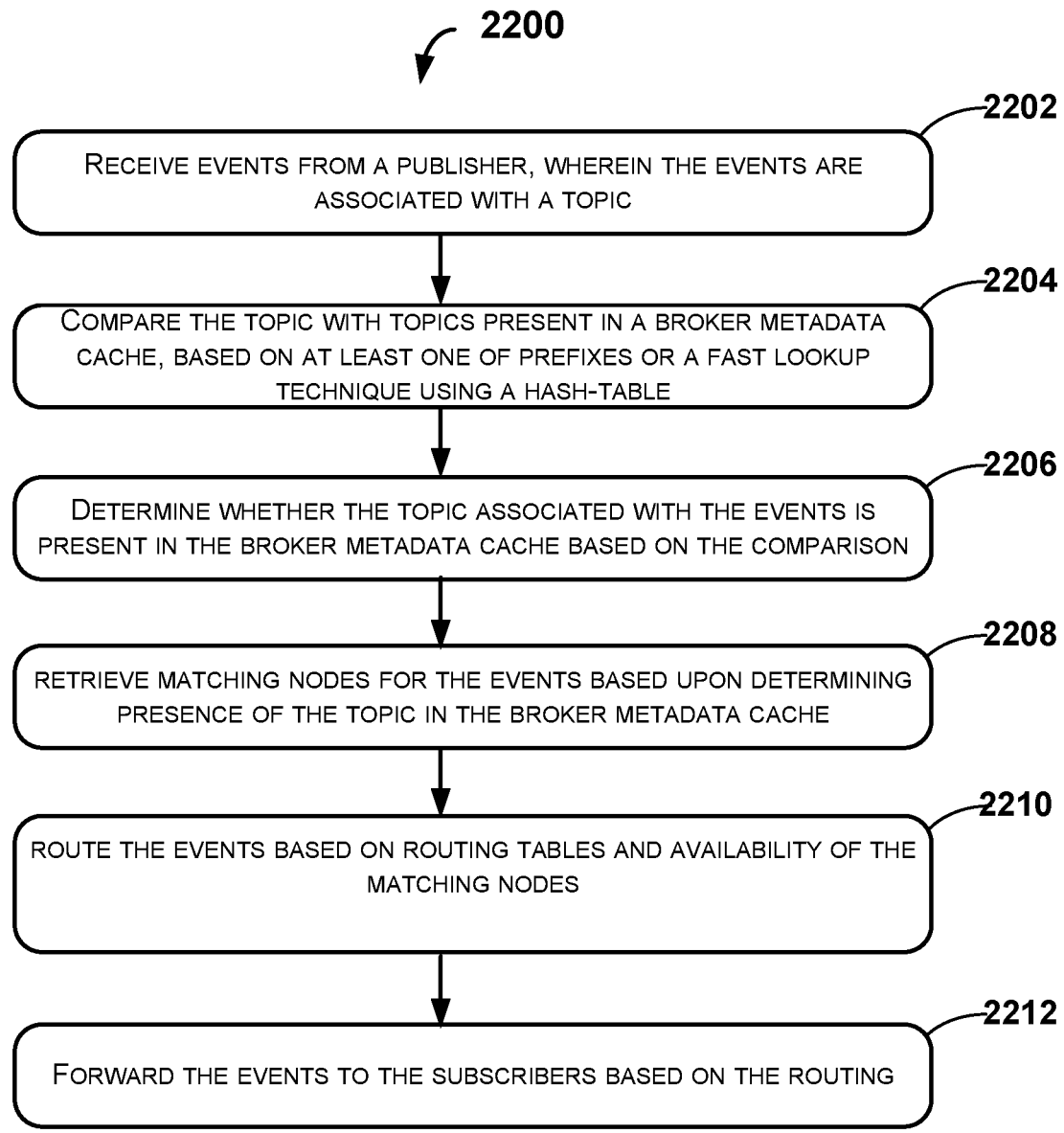
FIG. 22 illustrates an exemplary method for filtering of the events by a filter present in the system, according to an example embodiment of the present disclosure.

FIG. 22 illustrates an exemplary method for filtering of the events by a filter 206 present in the system, according to an example embodiment of the present disclosure.

At block 2202, events are received from the publisher 106. In an example, each of the events is associated with a topic, a subject, and an event type.

At block 2204, the topic is compared with topics present in broker metadata cache 310, based on one of prefixes or a fast lookup technique using a hash-table. In an example, the filter 206 may select initial characters of the subject too look for matching node. The initial characters of the subject are used as prefix. In another example, the filter 206 may assign a topic to each node of a tree. In this way, the tree can be traced faster. In another example, the filter 206 may assign a unique identified (ID) to the topic. For example, the filter 206 may assign UID1 to the topic "tennis". In this manner, the filter 206 needs to look for fewer characters to find a matching node. In another example, the filter 206 may split an event query for nodes with child nodes less than a predefined number.

At block 2206, it is determined whether the topic associated the events is present in the broker metadata cache 310. In an example, if the topic is not present in the broker metadata cache 310, the filter 206 may retrieve a topic from the metadata store 312.

At block 2208, the matching nodes are retrieved for the events once the metadata for the topic is located and compared with the event.

At block 2210, the events are routed based on routing tables and availability of the matching nodes. In an example, the filter 206 may filter 206 some of the events before sending it to the subscriber 104 based on the subscription.

At block 2212, the targeted event notifications are sent to the subscribers 104 based on the routing.

Figure 23:
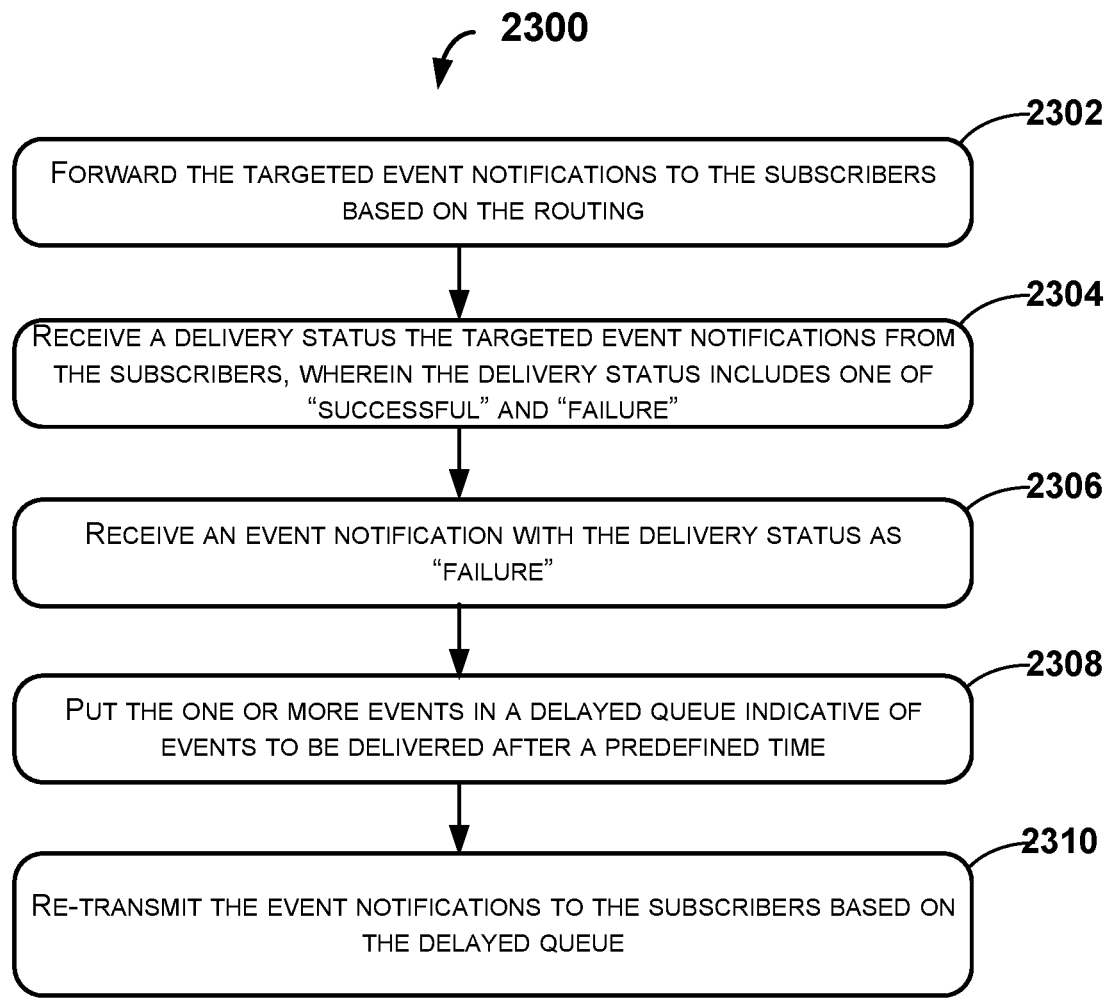
FIG. 23 illustrates an exemplary method for re-transmitting the targeted event notifications, according to an example embodiment of the present disclosure.

FIG. 23 illustrates an exemplary method for re-transmitting the targeted event notifications, according to an example embodiment of the present disclosure.

At block 2302, the targeted event notifications are forwarded to the subscribers 104 based on the routing. In an example, the events for which the subscribers 104 have subscribed are sent to the subscribers 104 after filtering.

At block 2304, a delivery status of each event notification is received from the subscribers 104. In an example, once the event notification is transmitted, the delivery status is received based on availability of the subscriber 104. If the event notifications are delivered successfully then the delivery status is "successful". Else, the delivery status is "failure".

At block 2306, an event notification with the delivery status as "failure" is received. In an example, the delivery status indicates that the transmission of the targeted event notification was not successful. In such cases, the re-director 212 may put the event notification on a subscription probation if the delivery status is "failure" even after multiple re-transmissions. In an example, the subscription probation includes at least one level indicating failure rate of the event notification.

Further, the re-director 212 may determine a subscription flow control rate based on flow parameters. Examples of the flow parameters may include a delivery average success rate, an average failure rate, an average latency, or number of event notifications that were delivered but not yet acknowledged by subscribers 104.

At block 2308, the targeted event notifications are placed in a delayed queue indicative of events to be delivered after a predefined time. In an example, the delayed queue may specify the predefined time after which the event notification will be sent again.

Further, in cases the subscription flow rate higher than a flow threshold and the subscription probation higher than a probation threshold, then the event notifications may be put in an individual delayed queue for that particular subscriber 104. The re-director 212 may periodically check whether the subscriber 104 is available for transmission of the event notification. Once the subscriber 104 is available for the transmission, the re-director 212 may transfer the event notifications form the individual delayed queue to a shared queue of the events.

At block 2310, re-transmit the targeted event notifications to the subscribers 104 based on the delayed queue. In an example, the re-director 212 may start re-transmitting the targeted event notification present in the shared queue.

Figure 24:
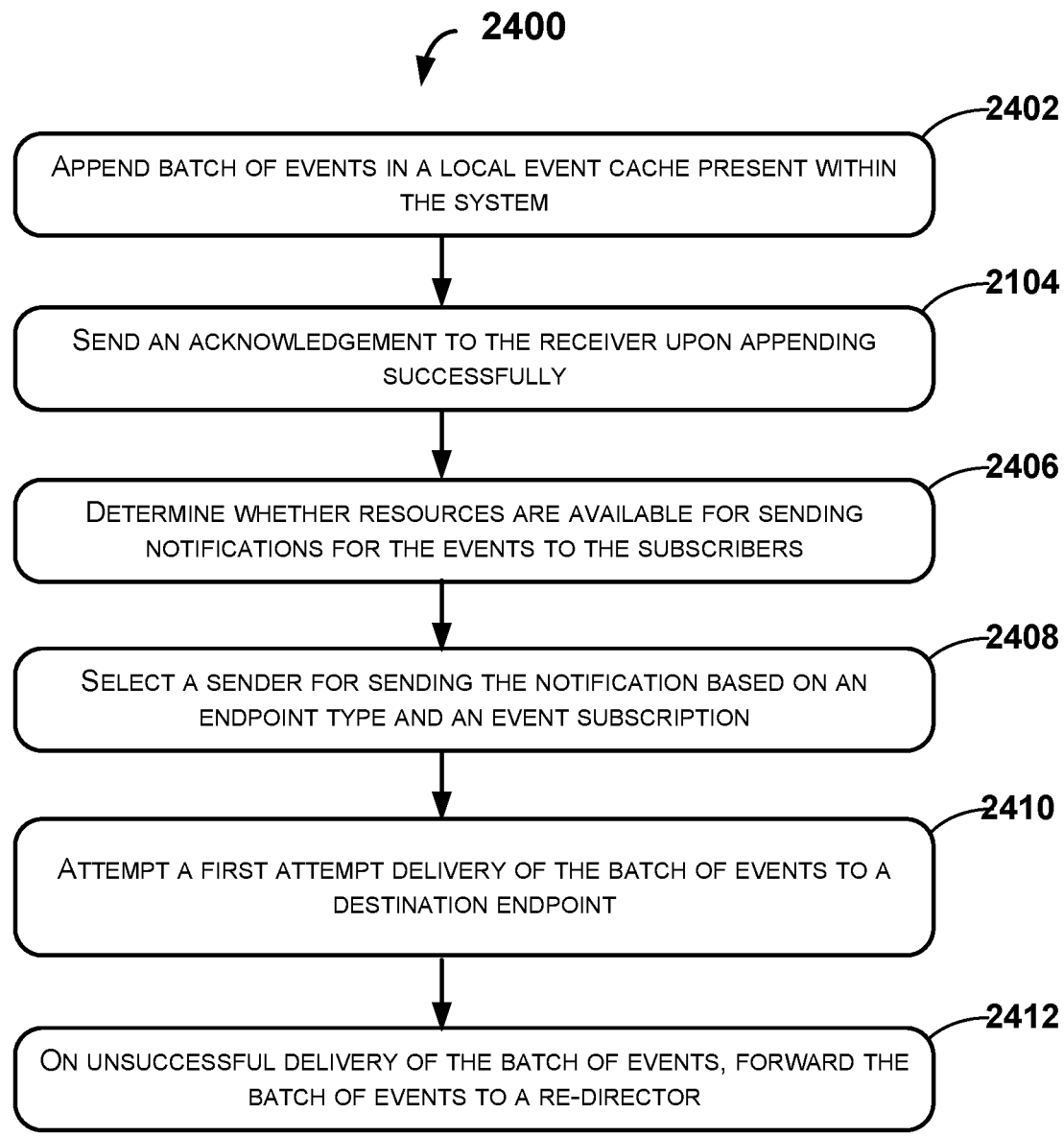
FIG. 24 illustrates an exemplary method for instant delivery of the targeted event notifications, according to an example embodiment of the present disclosure.

FIG. 24 illustrates an exemplary method for instant delivery of the targeted event notifications, according to an example embodiment of the present disclosure.

At block 2402, a batch of events is appended in a local event cache present within the system. In an example, the batch of events is appended in the local event cache so that the events can be compared instantly and a notification is sent to the subscribers 104.

At block 2404, an acknowledgement is sent to the receiver to indicate that appending of the events was successful.

At block 2406, it is determined whether resources are available for sending notifications for the events to the subscribers 104 or not. In an example, it may be identified whether the brokers 302 are available for the processing of the events.

At block 2408, a sender is selected for sending the notification based on an endpoint type and an event subscription. In an example, the sender may perform various operations to make the delivery of the targeted event notifications instant. The sender may de-serialize identifiers (IDs) and topics; assign priorities to an event broker node, use the same memory buffer, use the same thread for filtering and sending the event notifications, use delivering system properties in a different structure, or track health of the subscribers 104 for instant delivery of the targeted event notifications At block 2410, a first attempt delivery of the batch of events is to a destination endpoint is attempted.

At block 2412, on unsuccessful delivery of the batch of events, the batch of events is re-directed to a re-director 212 for re-transmission of the targeted event notification. In an example, the re-director 212 may determine an event termination signal based on time-to-live associated with the events and a retry threshold. Once the time-to-live associated with the event has expired and the retry threshold has been reached, the event notification may be put in a dead lettered event queue which means the event notification for that particular event may not be re-transmitted again.

Figure 25:
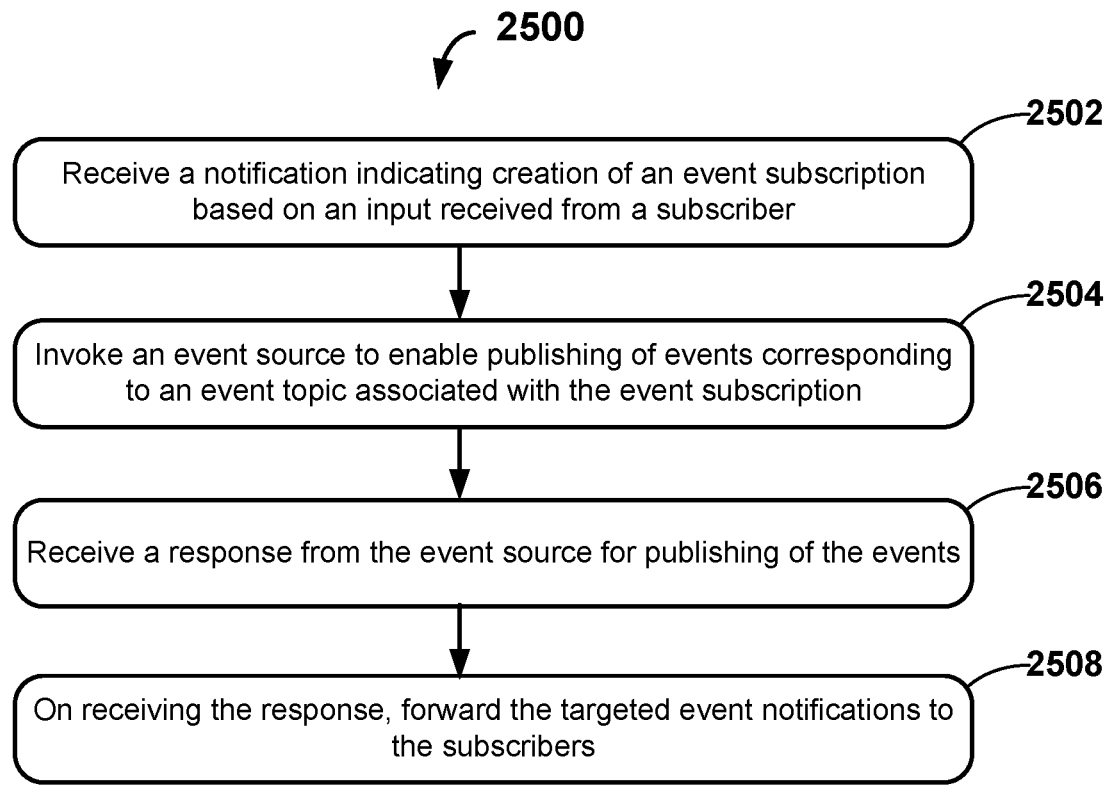
FIG. 25 illustrates an exemplary method for managing subscriptions for sending the targeted event notifications, according to an example embodiment of the present disclosure.

FIG. 25 illustrates an exemplary method for managing subscriptions for sending the targeted event notifications, according to an example embodiment of the present disclosure.

At block 2502, a notification indicating creation of an event subscription by a subscriber 104 is received through an input, such as a one-gesture input. In an example, the subscriber 104 may use a computing device to communicate creation/deletion of a subscription through the one-gesture input. Examples of the one-gesture input may include clicking on a hyperlink, selecting an option from a drop-down menu, drawing a pattern on a touch-sensitive display of a computing device. In an example, all the subscriptions may be stored within the subscription manager 214.

At block 2504, an event source 106 is invoked to enable publishing of events corresponding to an event topic associated with the event subscription. In an example, after receiving the one-gesture input from the subscriber 104, the subscription manager 214 may send the request to the event source 106. In an example, the subscriber 104 may use the one-gesture input to delete an event subscription from the event source 106. In such cases, the subscription manager 214 may instruct the event source 106 to delete the subscription.

At block 2506, a response is received from the event source 106 for publishing of the events. In an example, the event source 106 may send the response indicating the changes made in the subscription for the subscriber 104. In an example, the event source 106 may send a request periodically to the subscription manager 214 to update the event subscriptions with newly created or deleted event subscription.

At block 2508, the targeted event notifications are forwarded to the subscribers 104 on receiving the response from the event source 106. In an example, the subscription manager 214 may communicate with the event source 106 through a broker to update the event subscriptions in the event source 106. In this manner, the targeted notifications are sent to the subscriber 104 while considering the subscription requests from the subscribers 104 dynamically.

Thus, the present subject matter discloses systems and methods that are scalable and have a governing mechanism to manage resources for sending the targeted notifications. Further, the present subject matter employs a filtering and routing mechanism before transmitting the event notifications based on the subscriptions. The subscriptions can be requested by the subscribers 104 through "one-gesture"

input. Further, the present subject matter discloses an instant delivery of the targeted notification along with a re-transmission mechanism.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A system comprising:
    a processor;
    a memory; and
    a subscription manager comprising machine readable instructions stored in the memory and executable by the processor to:
        receive a notification indicating creation of an event subscription based on an input received from a subscriber;
        responsive to receiving the notification from the subscriber, invoke an event source to enable publishing of events, occurring at the event source, corresponding to an event topic associated with the event subscription;
        receive a response from the event source for publishing of the events;
        on receiving the response, forward a targeted event notification to the subscriber;
        receive a notification indicating deletion of the event subscription by the subscriber;
        instruct the event source to delete the event subscription for the subscriber to stop further targeted event notifications of the event subscription for the subscriber; and
        receive a query from the event source to specify a set of event subscriptions that have been created for a plurality of topics belonging to the event source for determining whether to disable publishing of events for the plurality of topics, occurring at the event source, from the event source.

2. The system as claimed in claim 1, wherein the input received from the subscriber is a one-gesture input.

3. The system as claimed in claim 1, wherein the subscription manager is to receive a request from an event source to periodically update event subscriptions with a newly created event subscription.

4. The system as claimed in claim 1, wherein the subscription manager is to receive a request from an event source to stop the targeted event notification for deleted event subscriptions.

5. The system as claimed in claim 1, wherein the subscription manager is to interact with a broker to update event subscriptions in the event source.

6. A computer-implemented method comprising:
    receiving, by a subscription manager comprising machine readable instructions stored in a memory and executable by a processor, a notification indicating creation of an event subscription based on an input received from a subscriber;
    responsive to receiving the notification from the subscriber, invoking, by the subscription manager, an event source to enable publishing of events, occurring at the event source, corresponding to an event topic associated with the event subscription;
    receiving, by the subscription manager, a response from the event source for publishing of the events;
    on receiving the response, forwarding, by the subscription manager, a targeted event notification to the subscriber;
        receiving a notification indicating deletion of the event subscription by the subscriber;
        instructing the event source to delete the event subscription for the subscriber to stop further targeted event notifications of the event subscription for the subscriber; and
        receiving a query from the event source to specify a set of event subscriptions that have been created for a plurality of topics belonging to the event source for determining whether to disable publishing of events for the plurality of topics, occurring at the event source, from the event source.

7. The method as claimed in claim 6, wherein the input received from the subscriber is a one-gesture input.

8. The method as claimed in claim 6, wherein the method further comprises receiving a request from an event source to periodically update event subscriptions with a newly created event subscription.

9. The method as claimed in claim 6, wherein the method further comprises receiving a request from an event source to stop the targeted event notification for deleted event subscriptions.

10. The method as claimed in claim 6, wherein the method further comprises interacting with a broker to update event subscriptions in the event source.

11. A non-transitory computer readable medium including machine readable instructions that are executable by a processor to:
    receive a notification indicating creation of an event subscription based on an input received from a subscriber;
    responsive to receiving the notification from the subscriber, invoke an event source to enable publishing of events, occurring at the event source, corresponding to an event topic associated with the event subscription;
    receive a response from the event source for publishing of the events;
    on receiving the response, forward a targeted event notification to the subscriber;
    receive a notification indicating deletion of the event subscription by the subscriber;
    instruct the event source to delete the event subscription for the subscriber to stop further targeted event notifications of the event subscription for the subscriber; and
    receive a query from the event source to specify a set of event subscriptions that have been created for a plurality of topics belonging to the event source for determining whether to disable publishing of events for the plurality of topics, occurring at the event source, from the event source.

12. The non-transitory computer readable medium as claimed in claim 11, wherein the input received from the subscriber is a one-gesture input.

13. The non-transitory computer readable medium as claimed in claim 11, further including instructions executable by the processor to receive a request from an event source to periodically update the event subscriptions with a newly created event subscription.

14. The non-transitory computer readable medium as claimed in claim 11, further including instructions executable by the processor to receive a request from an event source to stop the targeted event notification for deleted event subscriptions.

15. The non-transitory computer readable medium as claimed in claim 11, further including instructions executable by the processor to interact with a broker to update the event subscriptions in the event source.

* * * * *